(12) United States Patent
Fuji et al.

(10) Patent No.: US 8,024,175 B2
(45) Date of Patent: Sep. 20, 2011

(54) COMPUTER PROGRAM, APPARATUS, AND METHOD FOR SEARCHING TRANSLATION MEMORY AND DISPLAYING SEARCH RESULT

(75) Inventors: Masaru Fuji, Kawasaki (JP); Seiji Okura, Kawasaki (JP); Tomoki Nagase, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1002 days.

(21) Appl. No.: 11/975,767

(22) Filed: Oct. 22, 2007

(65) Prior Publication Data

US 2008/0162115 A1 Jul. 3, 2008

(30) Foreign Application Priority Data

Dec. 28, 2006 (JP) ................................ 2006-355467

(51) Int. Cl.
*G06F 17/28* (2006.01)
(52) U.S. Cl. ............. 704/7; 704/2; 704/3; 704/4; 704/8; 704/9; 704/277; 741/762; 741/202; 741/203; 741/264
(58) Field of Classification Search .............. 704/4, 277, 704/2, 3, 8, 9; 715/762, 202, 203, 264
See application file for complete search history.

(56) References Cited

U.S. PATENT DOCUMENTS

| | | | | |
|---|---|---|---|---|
| 5,608,623 | A * | 3/1997 | Sata et al. | 704/4 |
| 6,651,039 | B1 * | 11/2003 | Ikuta et al. | 704/4 |
| 7,107,204 | B1 * | 9/2006 | Liu et al. | 704/2 |
| 2001/0029455 | A1 * | 10/2001 | Chin et al. | 704/277 |
| 2002/0040292 | A1 * | 4/2002 | Marcu | 704/4 |
| 2002/0154165 | A1 * | 10/2002 | Yu | 345/762 |
| 2002/0193986 | A1 * | 12/2002 | Schirris | 704/8 |
| 2005/0131673 | A1 * | 6/2005 | Koizumi et al. | 704/2 |
| 2006/0015323 | A1 * | 1/2006 | Udupa et al. | 704/9 |
| 2006/0095248 | A1 * | 5/2006 | Menezes et al. | 704/3 |
| 2007/0016400 | A1 * | 1/2007 | Soricutt et al. | 704/9 |
| 2009/0292525 | A1 * | 11/2009 | Goishi | 704/9 |

FOREIGN PATENT DOCUMENTS

| | | |
|---|---|---|
| JP | 2003-330924 | 11/2003 |
| JP | 2004-110583 | 4/2004 |
| JP | 2006-134062 | 5/2006 |

* cited by examiner

*Primary Examiner* — Richemond Dorvil
*Assistant Examiner* — Michael Colucci
(74) *Attorney, Agent, or Firm* — Fujitsu Patent Center

(57) ABSTRACT

A translation memory system enabling the user to not only narrow down the view range of search result, but also view a surrounding context of a retrieved text. Stored parallel texts include sentence-class and segment-class parallel texts. Parallel texts relevant to a given input text are retrieved and subjected to calculation of match rates with respect to the input text. A downward link is then added to each retrieved sentence-class parallel text, while an upward link is added to each retrieved segment-class parallel text. A search result screen shows a best matching parallel text with an expand button and/or a shrink button. The expand button causes the current parallel text to be replaced with an upper-class parallel text pointed at by a corresponding upward link. The shrink button causes the current parallel text to be replaced with a lower-class parallel text pointed at by a corresponding downward link.

15 Claims, 33 Drawing Sheets

FIG. 5

SENTENCE-CLASS PARALLEL TEXT

21: これは私の弟が先週の水曜日に東京で買った本で、あれが彼の妹が昨日学校で拾ったペンです。
This is the book which my brother purchased last Wednesday in Tokyo, while that is the pen which his sister picked up at school yesterday.

SEGMENT/SUBSEGMENT-CLASS PARALLEL TEXTS

22: /これは私の弟が先週の水曜日に東京で買った本で、/
/This is the book which my brother purchased last Wednesday in Tokyo,/

23: /先週の水曜日に東京で買った／
/purchased last Wednesday in Tokyo,/

24: /あれが彼の妹が昨日学校で拾ったペンです。/
/while that is the pen which his sister picked up at school yesterday./

25: /昨日学校で拾った/
/picked up at school yesterday./

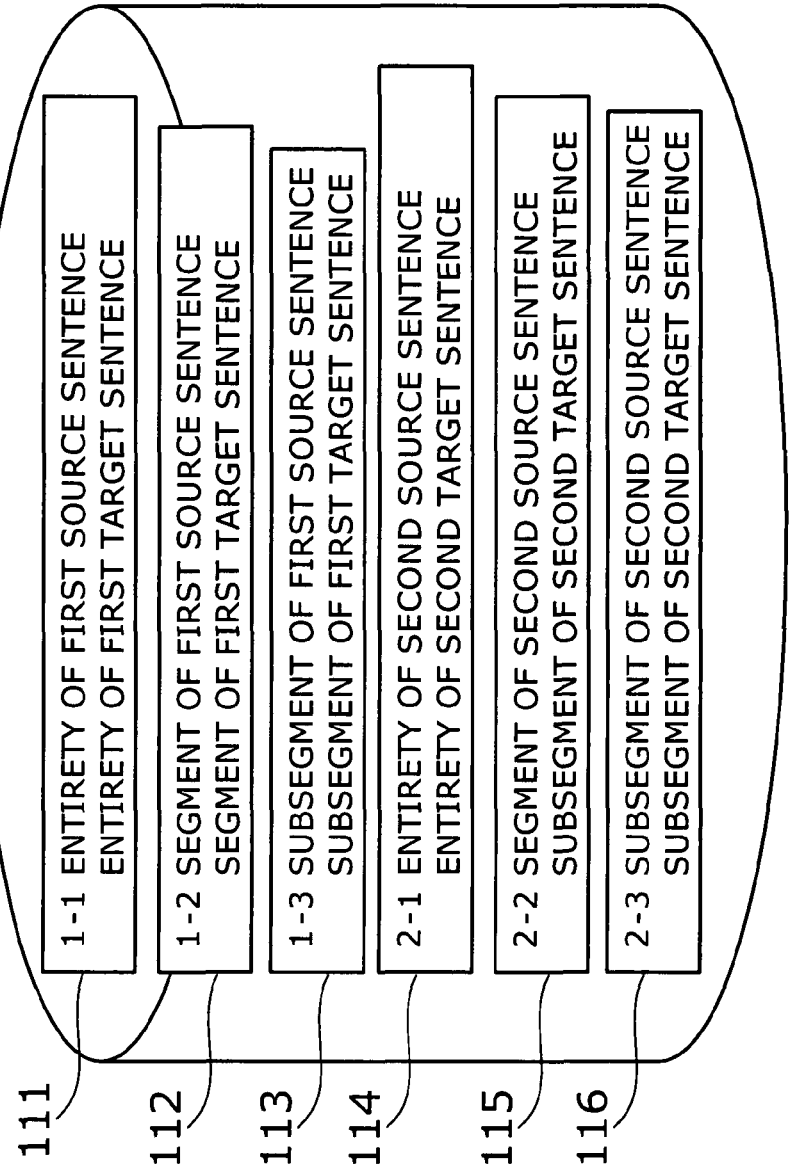

COMPUTER PROGRAM, APPARATUS, AND METHOD FOR SEARCHING TRANSLATION MEMORY AND DISPLAYING SEARCH RESULT

CROSS-REFERENCE TO RELATED APPLICATIONS

This application is based upon and claims the benefits of priority from the prior Japanese Patent Application No. 2006-355467 filed Dec. 28, 2006, the entire contents of which are incorporated herein by reference.

BACKGROUND OF THE INVENTION

1. Field of the Invention

The present invention relates to a computer program, apparatus, and method for searching a translation memory database to find entries matching a given source text and displaying corresponding target-language texts that are previously translated. More particularly, the present invention relates to such a computer program, apparatus, and method that compare texts not only on a sentence basis, but also on a smaller segment basis.

2. Description of the Related Art

Translators working in industrial fields are required to produce translations at a high throughput while ensuring their quality. Translation memory systems are used to aid human translators to build a database of previously translated texts and reuse them as a reference in a new translation project. With an input text entered for translation, the translation memory system searches its database to retrieve entries containing a source text similar to the given input text and then displays target-language translations in the retrieved database entries.

When the given input text is an entirely new text, it is unlikely that the translation memory system gives an exact match for that text. Some existing systems therefore divide an input text into segments when searching the database, in the hope of finding a good partial match at a phrase level (see, for example, Japanese Patent Application Publication No. 2006-134062).

A combination of a source-language text and its equivalent target-language text is called a "parallel text." Suppose that a parallel text is retrieved from the translation memory database and displayed on a computer screen. The user then scrutinizes the parallel text visually to determine by him/herself which part of the text can be used for his/her translation work. This task is often burdensome, particularly in the case where the parallel text shown on the screen is long in length. In view of this problem, some existing systems aid the user to find an appropriate part of translations being displayed. One of such existing systems guesses source-target word pairs by analyzing retrieved parallel texts together and presents the result with emphasis on the word pairs that are found.

More specifically, the system searches a database of parallel texts and displays the entries matching an input text, giving emphasis on the matched portions, thus reducing the user's burden of seeking which part to reuse. It may also be possible to highlight the word pairs in multiple parallel texts retrieved from the database (see, for example, Japanese Patent Application Publication No. 2003-330924).

In the field of monolingual text search, an index system called "Key Word In Context" (KWIC) has been used to search a document for a specific keyword. The KWIC index enables a match to be extracted together with its surrounding context. The user can thus view not only the exact portion of that match, but also its surrounding text, on a search result screen.

While the user may be able to recognize matched words easier, the above-mentioned translation memory system still outputs long sentences as they are. Since long sentences occupy a large area on the monitor screen, the conventional system is unable to display many candidate texts on a single screen. Even if the system has successfully found a particularly good match, the user would have difficulty in locating that text on the search result screen because of the presence of many other matches which may not be useful for him/her. In such a case, the conventional translation memory system does not help much in improving the efficiency of translation work.

Some other systems have a database of parallel texts in the form of more smaller, bilingual text segments, so that a translation memory search will focus on a necessary portion. The search result is narrow in the first place and only requires a small screen space, but this means in turn that the user is unable to see the entire context of the retrieved translation.

SUMMARY OF THE INVENTION

In view of the foregoing, it is an object of the present invention to provide a computer program, apparatus, and method for displaying a result of a translation memory search in a more efficient and flexible manner, such that the user can not only narrow down the view range of a parallel text on the monitor screen, but also view the surrounding context of a retrieved text.

To accomplish the above object, the present invention provides a computer-readable medium storing a program for searching a translation memory and displaying retrieved translations. This program causes a computer to function as the following elements: a parallel text memory, a relation link memory, an input text receiver, a search processor, a match rate calculator, a link adder, a result screen generator, and a view range selector. These elements operate as follows.

The parallel text memory stores a plurality of parallel texts each being a text in a source language together with its translation into a target language. Those parallel texts are classified into several types. Specifically, one class is "sentence-class parallel text" which is formed from a source sentence in the source language together with its translation in the target language. Another class is "segment-class parallel text" which is formed from a source segment together with its translation.

The relation link memory stores relation links representing containment relationships between source sentences and source segments. In the containment hierarchy, a containing text is located at an upper level with respect to a contained text. Stated reversely, a contained text is located at a lower level with respect to a containing text.

The input text receiver receives an input text as an object to be analyzed and translated. Using this input text as a search key, the search processor searches the above parallel text memory to retrieve parallel texts whose source sentences or source segments are relevant to the input text. When such parallel texts are found, the match rate calculator calculates a match rate of each retrieved parallel text. The match rate may be, for example, proportional to the number of common characters found in both the input text and the source sentence or source segment of each parallel text.

The link adder adds a downward link to each retrieved sentence-class parallel text by consulting the relation link memory, so as to link that sentence-class parallel text to its relevant segment-class parallel text. The link adder also adds an upward link to each retrieved segment-class parallel text by consulting the relation link memory, so as to link that segment-class parallel text to its relevant sentence-class parallel text.

The result screen generator produces a search result screen showing at least one parallel text with a highest match rate, which is selected out of all the sentence-class and/or segment-class parallel texts that have been retrieved. The view range of a parallel text on the search result screen is managed by the view range selector. Specifically, in response to an expand command, the view range selector replaces the current parallel text with an upper-class parallel text pointed at by the upward link added to the current parallel text. Or in response to a shrink command, the view range selector replaces the current parallel text with a lower-class parallel text pointed at by the downward link added to the current parallel text.

The above and other objects, features and advantages of the present invention will become apparent from the following description when taken in conjunction with the accompanying drawings which illustrate preferred embodiments of the present invention by way of example.

BRIEF DESCRIPTION OF THE DRAWINGS

FIG. 5 shows an example of parallel texts.

FIG. 6 shows an example data structure of a parallel text database.

DESCRIPTION OF THE PREFERRED EMBODIMENTS

Figure 1:
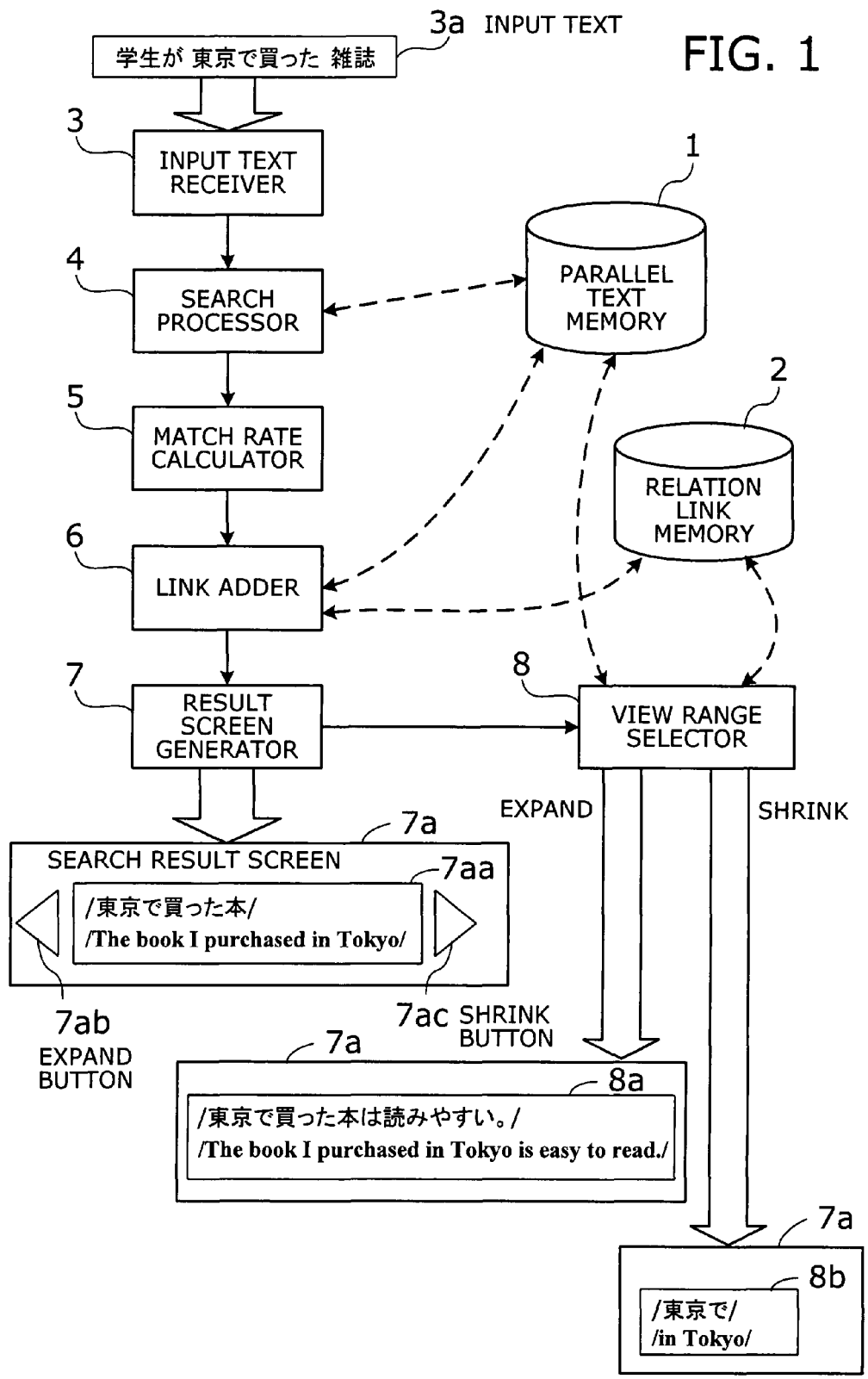
FIG. 1 gives an overview of the present invention.

Preferred embodiments of the present invention will be described below with reference to the accompanying drawings, wherein like reference numerals refer to like elements throughout.

FIG. 1 gives an overview of the present invention. The present invention provides a translation memory system including the following elements: a parallel text memory 1, a relation link memory 2, an input text receiver 3, a search processor 4, a match rate calculator 5, a link adder 6, a result screen generator 7, and a view range selector 8.

The parallel text memory 1 stores a plurality of parallel texts. Each parallel text is, generally, a text in a source language (referred to as "source text") together with its translation in a target language ("target text"). Such parallel texts are classified into several types according to a containment hierarchy of source texts. Specifically, one class is "sentence-class parallel text" which is a source sentence together with its translation, and another class is "segment-class parallel text" which is a source segment together with its translation. The term "source segment" refers to a part of a source sentence. Note that the term "sentence" should never be interpreted in a limited sense; the term may refer to, for example, a word, clause, or phrase or a group of clauses or phrases forming a syntactic unit.

A single source sentence may produce two or more source segments, and a portion of a source segment may constitute a source text part of a parallel text. Such a portion of a source segment is called "source subsegment." Yet another class of parallel texts for this is, therefore, "subsegment-class parallel text." A subsegment-class parallel text is formed from a source subsegment together with its translation. For simplicity purposes, however, this section of the description assumes sentence and segment classes, while leaving the subsegment class aside. More classes will be discussed in later sections.

The relation link memory 2 stores relation links describing containment relationship between source sentences and source segments. Specifically, a containing text and a contained text are located respectively at an upper level and a lower level in a containment hierarchy. That is, a source sentence is an upper-level text with respect to its segments. Stated reversely, a source sentence regards its segment as a lower-level text.

The input text receiver 3 receives an input text 3*a* as an object to be analyzed and translated. The search processor 4 searches the parallel text memory 1 using the given input text 3*a* as a search key to retrieve relevant parallel texts whose source text part matches the input text at least partly. For example, the search processor 4 may search the source text part (i.e., source sentence and segment) of each parallel text in an attempt to find a partial match. The partial matching algorithm retrieves similar sentences or segments that may not exactly match with the given input text. Specifically, a parallel text will be detected as a partial match if it has at least one source-language character that is also found in the input text.

The match rate calculator 5 calculates a match rate for each parallel text retrieved by the search processor 4. The match rate may represent the number of common characters found in both the input text 3a and the source sentence or source segment of that parallel text. More specifically, the match rate calculator 5 divides the number of common characters by the total number of characters of the source sentence or segment.

The link adder 6 adds a downward link and/or an upward link to each parallel text retrieved by the search processor 4 by consulting the relation link memory 2. Specifically, the link adder 6 adds a downward link to a sentence-class parallel text, so as to link that parallel text to its corresponding lower-class (i.e., segment class) parallel text that has also been retrieved as a match. The link adder 6 also adds an upward link to a segment-class parallel text, so as to link that parallel text to its corresponding upper-class (i.e., sentence class) parallel text. The link adder 6 may add a plurality of downward links to a single parallel text. This will happen in the case there are a plurality of segment-class parallel texts derived from a single common source sentence.

The result screen generator 7 produces a search result screen 7a to show a parallel text 7aa with the highest match rate, which is selected out of all the sentence-level and segment-level parallel texts (not shown) retrieved as being similar to the given input text. More specifically, if the retrieved parallel texts have different origins (i.e., derived from different source sentences), the result screen generator 7 chooses a highest match from each family of parallel texts.

In addition to displaying a best match parallel text 7aa, the result screen generator 7 places an expand button 7ab and a shrink button 7ac representing an upward link and a downward link of the parallel text 7aa on the search result screen 7a. The result screen generator 7 may layout an expand button 7ab on the left of the parallel text 7aa and a shrink button 7ac on the right, for example, as shown in FIG. 1.

The view range selector 8 replaces the currently displayed parallel text 7aa with an upper-class parallel text 8a pointed at by the upward link set to the currently displayed parallel text 7aa, in response to an expand command. More specifically, the view range selector 8 detects an expand command from an event selecting the expand button 7ab representing a link to an upper-class parallel text 8a. The view range selector 8 then replaces the current parallel text 7aa with the parallel text 8a associated with the expand button 7ab.

The view range selector 8 is also responsive to a shrink command. It replaces the currently displayed parallel text 7aa with a lower-class parallel text 8b pointed at by the downward link set to the currently displayed parallel text 7aa, in response to a shrink command. More specifically, the view range selector 8 detects a shrink command from an event selecting the shrink button 7ac representing a link to a lower-class parallel text 8b. The view range selector 8 then replaces the current parallel text 7aa with the parallel text 8b associated with the shrink button 7ac.

In operation, the above-described translation memory system subjects a given input text 3a to a translation memory search, where the source sentences and source segments registered in the parallel text memory 1 are compared with the input text. The system displays the search result, together with an expand button 7ab and a shrink button 7ac. The user is allowed to select either of those buttons to expand the view range to see more around the currently shown translation, or to shrink the view range to focus on a particular segment corresponding to the input text 3a. The present invention permits the user to select a desired view range by moving up and down the containment hierarchy of parallel texts. Besides making it easier to browse the search result, the present invention enables the user to make access to the entire context. The user can therefore work more efficiently with his/her translation memory system.

The following sections will describe more specific embodiments of the present invention, assuming that the proposed translation memory systems are used to help translation of Japanese text into English text.

First Embodiment

Figure 2:
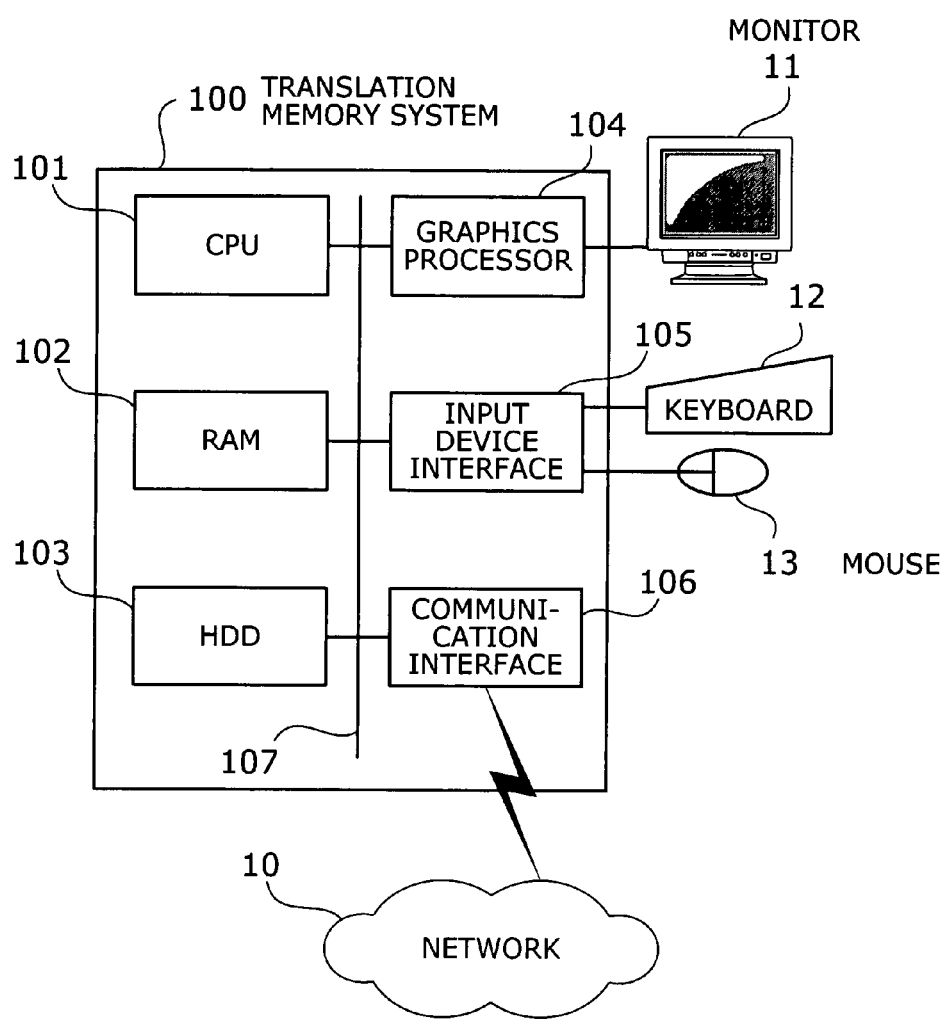
FIG. 2 shows an example hardware configuration of a translation memory system according to an embodiment of the present invention.

FIG. 2 shows an example hardware configuration of a translation memory system according to an embodiment of the present invention. This translation memory system 100 has the following functional elements: a central processing unit (CPU) 101, a random access memory (RAM) 102, a hard disk drive (HDD) 103, a graphics processor 104, an input device interface 105, and a communication interface 106. The CPU 101 controls the entire system 100, interacting with other elements via a bus 107.

The RAM 102 serves as temporary storage for the whole or part of operating system (OS) programs and application programs that the CPU 101 executes, in addition to other various data objects manipulated at runtime. The HDD 103 stores program and data files of the operating system and various applications.

The graphics processor 104 produces video images in accordance with drawing commands from the CPU 101 and displays them on the screen of a monitor 11 coupled thereto. The input device interface 105 is used to receive signals from external input devices, such as a keyboard 12 and a mouse 13. Those input signals are supplied to the CPU 101 via the bus 107. The communication interface 106 is connected to a network 10, allowing the CPU 101 to exchange data with other computers (not shown) on the network 10.

The computer described above serves as a hardware platform for realizing the processing functions of every embodiment of the present invention.

Figure 3:
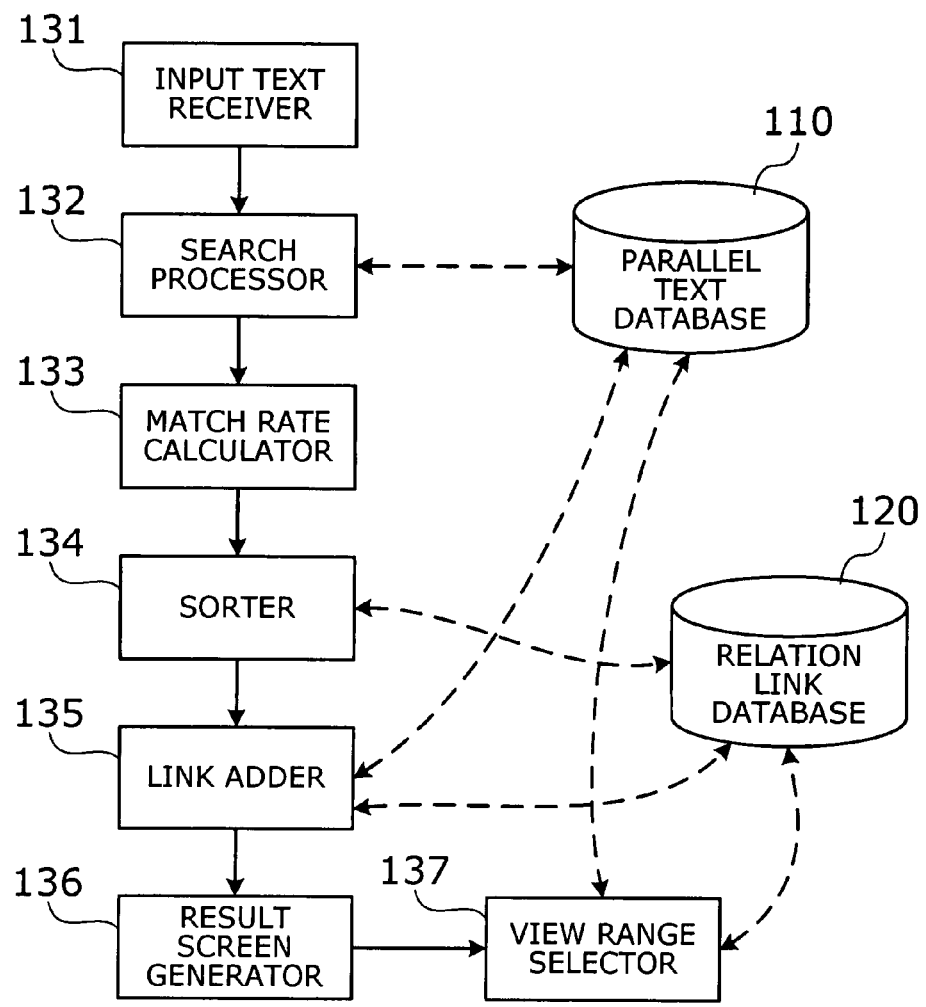
FIG. 3 is a functional block diagram of a translation memory system according to a first embodiment of the invention.

FIG. 3 is a functional block diagram of a translation memory system according to a first embodiment of the invention. This translation memory system 100 includes a parallel text database 110, a relation link database 120, an input text receiver 131, a search processor 132, a match rate calculator 133, a sorter 134, a link adder 135, a result screen generator 136, and a view range selector 137.

The parallel text database 110 is a collection of Japanese texts and their corresponding English translations. Each Japanese-English text pair is referred to as a parallel text. A storage space of the HDD 103, for example, may be allocated for this purpose. The entries of the parallel text database 110 are not only of full sentences, but also of their segments. Source texts form a hierarchical structure, where a sentence may be divided into segments and a segment may be subdivided into smaller segments. The parallel text database 110 contains parallel texts for such subdivided segments, or subsegments. That is, the parallel text database 110 contains subsegment-class parallel texts, in addition to sentence-class and segment-class entries. The term "source text" may be used, where appropriate, to refer collectively to a source sentence, source segment, and/or source subsegment.

The relation link database 120 is a collection of relation links, which represent hierarchical relationships between source sentences and their segments and subsegments. A storage space of the HDD 103, for example, may be allocated for this purpose. A relation link is actually an associated pair of identifiers representing two pieces of text having a parent-child relationship.

The input text receiver 131 receives an input text 3a (FIG. 1) as an object to be translated. For example, the input text receiver 131 may receive a Japanese sentence that the user has entered through a keyboard 12 (FIG. 2) or the like. When the user clicks a button to complete his/her text entry operation, the input text receiver 131 passes the input text to the search processor 132.

The search processor 132 seeks records of parallel texts similar to the given input text. Specifically, the search processor 132 searches the parallel text database 110 by using the input text as a search key. More specifically, the search processor 132 finds source texts and/or source segments that match with characters or character strings constituting the input text as a search key. Each time a match is found, the search processor 132 retrieves that parallel text. The final search result thus includes one or more parallel texts retrieved from the parallel text database 110. The search processor 132 then passes the input text together with the search result to the match rate calculator 133.

The match rate calculator 133 compares the input text with each retrieved parallel text received from the search processor 132, thereby calculating their match rate. Specifically, the match rate calculator 133 counts how many characters are found in both the input text and the source text part of a retrieved parallel text. The match rate calculator 133 then divides the number of such characters by the total number of characters constituting the source text part being compared. Each and every retrieved parallel text is subjected to this calculation, and the match rate calculator 133 provides the sorter 134 with the input text and every retrieved parallel text, along with their match rate.

The sorter 134 sorts the supplied parallel texts according to their match rates. Specifically, the sorter 134 first consults the relation link database 120 to retrieve relation links relevant to the retrieved parallel texts. The sorter 134 uses those relation links to sort the parallel texts into groups based on their containment relationships, such that each group will be a set of parallel texts deriving from a single common source sentence. Then the sorter 134 chooses from each group the best matching parallel text as a representative parallel text. Finally the sorter 134 sorts the groups in descending order of the match rates of representative parallel texts. The sorter 134 passes the resulting set of parallel text groups to the link adder 135.

The link adder 135 adds a relation link to each parallel text included in the sorted set of parallel text groups. Specifically, the link adder 135 first finds the identifier of a source text contained in each retrieved parallel text. The link adder 135 then consults the relation link database 120 to extract relation links to other source texts, based on the identifiers that are found. Lastly, the link adder 135 adds those relation links to corresponding parallel texts before passing them to the result screen generator 136. Each piece of link information added to parallel texts includes a flag indicating whether it is an upward link or a downward link. Also included is an identifier of a parallel text that the link points at.

The result screen generator 136 displays representative parallel texts on a screen of the monitor 11, along with their relation links in the form of buttons allowing the user to select a desired view range. Specifically, one button is used to expand the range to an upper level of the containment hierarchy of parallel texts. Another button is used to shrink the range to a lower level of the containment hierarchy of parallel texts.

The view range selector 137 handles user commands for expanding or shrinking a view range on the screen produced by the result screen generator 136, which is though the use of the range selection buttons mentioned above. Upon receipt of such a user command, the view range selector 137 expands or shrinks the view range of a specified parallel text according to the command. Expanding a view range means replacing the current parallel text with an upper-class parallel text linked from the current parallel text. Shrinking a view range means replacing the current parallel text with an upper-class parallel text linked from the current parallel text.

To expand the current range, the view range selector 137 refers to an identifier added to the current parallel text as an upward link therefrom. The view range selector 137 uses this identifier to retrieve a longer parallel text from the parallel text database 110. To shrink the current range, the view range selector 137 refers to an identifier added to the current parallel text as a downward link therefrom. The view range selector 137 uses this identifier to retrieve a shorter parallel text from the parallel text database 110.

Figure 4:
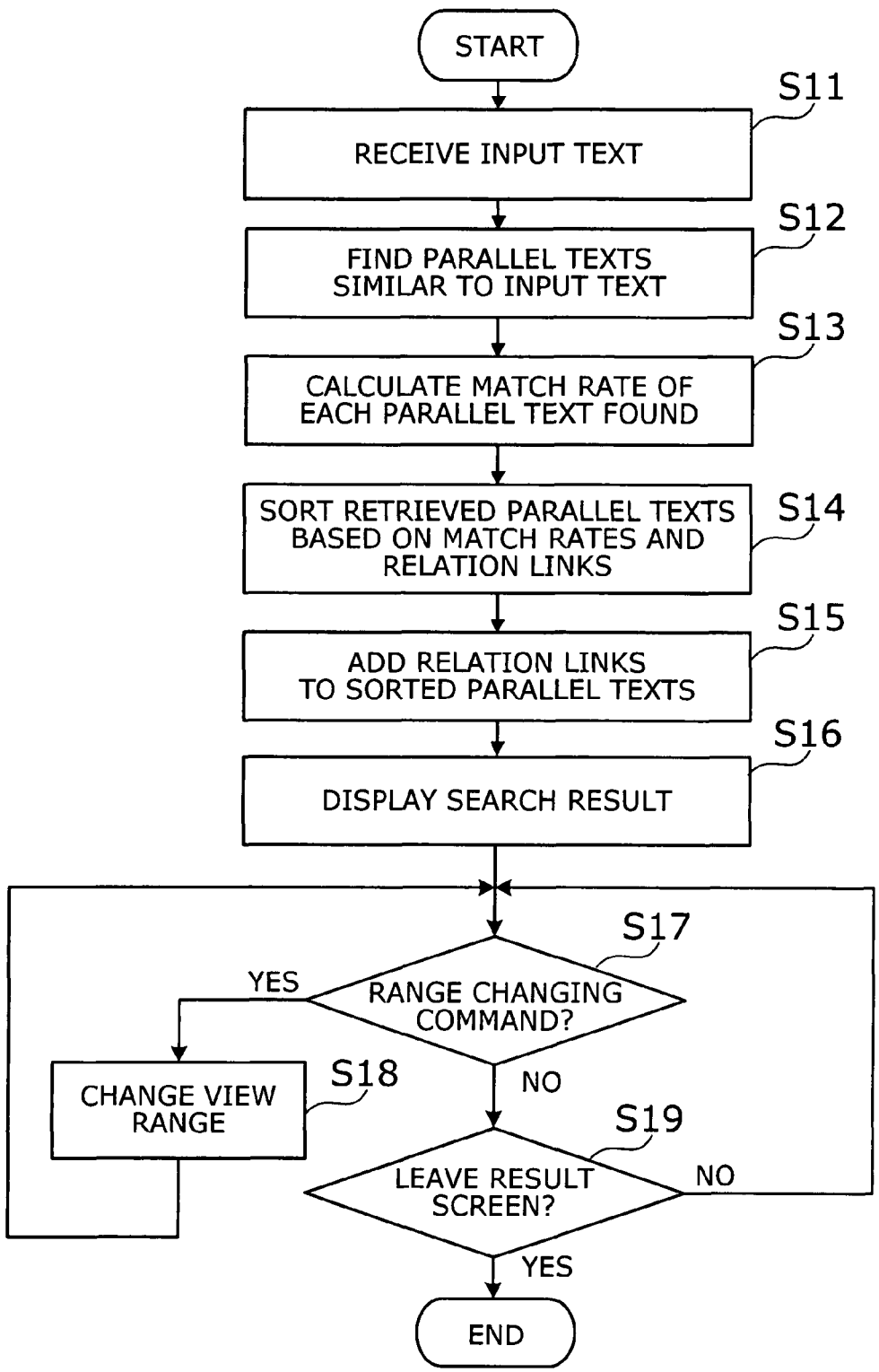
FIG. 4 is a flowchart of a translation memory search according to the first embodiment.

Referring to the flowchart of FIG. 4, the above-described translation memory system 100 searches a translation memory according to the following steps:

(Step S11) The input text receiver 131 receives an input text from the user.

(Step S12) The search processor 132 searches the parallel text database 110 to find parallel texts similar to the input text.

(Step S13) The match rate calculator 133 compares the input text with each parallel text that is found, thereby calculating their match rates.

(Step S14) The sorter 134 sorts the search result based on the match rates and relation links.

(Step S15) The link adder 135 adds relation links to the sorted parallel texts.

(Step S16) The result screen generator 136 displays the sorted parallel texts as a search result.

(Step S17) The view range selector 137 determines whether there is a range changing command (i.e., expand or shrink command) from the user. If there is, the process advances to step S18. If not, the process proceeds to step S19.

(Step S18) According to the given command, the view range selector 137 expands or shrinks the current view range of parallel text, thus updating the search result screen. The process then goes back to step S17.

(Step S19) The view range selector 137 determines whether the user has entered an end command to leave the search result screen. If so, the process terminates itself. If not, the process returns to step S17.

The above steps retrieve and display parallel texts relevant to the given input text. More detailed description of this process will follow.

As a prerequisite for using a translation memory, the user has first to collect many examples of source sentences and their translations. Such parallel texts are collected from translation products that qualified translators have created.

FIG. 5 shows example parallel texts 21 to 25 collected from a single document translated. The topmost parallel text 21 is composed of a source sentence and its equivalent translation. Two other parallel texts 22 and 24 are each composed of a segment of the source sentence and its translation. The third parallel text 23 is composed of a subsegment extracted from the source segment in the parallel text 22, together with its corresponding translation. Likewise, the fifth parallel text 25 is composed of a subsegment extracted from the source segment in the parallel text 24, together with its corresponding translation.

The parallel text database 110 stores parallel texts prepared beforehand using various source sentences. Qualified translators perform or manage all the preparatory tasks including translation of source sentences, extraction of segments, and translation of segments. Every segment extracted from a source sentence is supposed to have a clear meaning in itself. Translators analyze the semantic structure of a source sentence when they determine which part to pick up as a meaningful segment or subsegment. They enters extracted segments and subsegments to the parallel text database 110 using input devices such as a keyboard 12.

FIG. 6 shows an example data structure of a parallel text database. This parallel text database 110 stores a plurality of parallel texts 111 to 116, including entire source sentences and their segments and subsegments, together with their respective translations. The origins of these parallel texts 111 to 116 are first and second source sentences.

Each parallel text 111 to 116 has a unique identifier (ID). Specifically, this ID is composed of a source sentence identifier and a local serial number. The former distinguishes each source sentence from others. The latter is used to distinguish a segment or subsegment of a source sentence from other segments or subsegments of the same source sentence. In the example of FIG. 6, the source sentence identifier is followed by a local serial number, with a delimiter "-" between them.

The parallel text 111 is formed from a first source sentence and its translation (or first target sentence) and has an identifier of "1-1." The parallel text 112 is formed from a segment of the first source sentence and its translation (or segment of first target sentence) and has an identifier of "1-2." The parallel text 113 is formed from a subsegment (i.e., segment of segment) of the first source sentence and its translation (or subsegment of first target sentence) and has an identifier of "1-3."

The parallel text 114 is formed from a second source sentence and its translation (or second target sentence) and has an identifier of "2-1." The parallel text 115 is formed from a segment of the second source sentence and its translation (or segment of second target sentence) and has an identifier of "2-2." The parallel text 116 is formed from a subsegment of the second source sentence and its translation (or subsegment of second target sentence) and has an identifier of "2-3."

The parallel text database 110 stores those parallel texts 111 to 116 previously compiled by qualified translators. The source sentence identifiers of the parallel texts 111 to 116 indicate whether they are derived from the same source sentence or from different source sentences.

Figure 7:
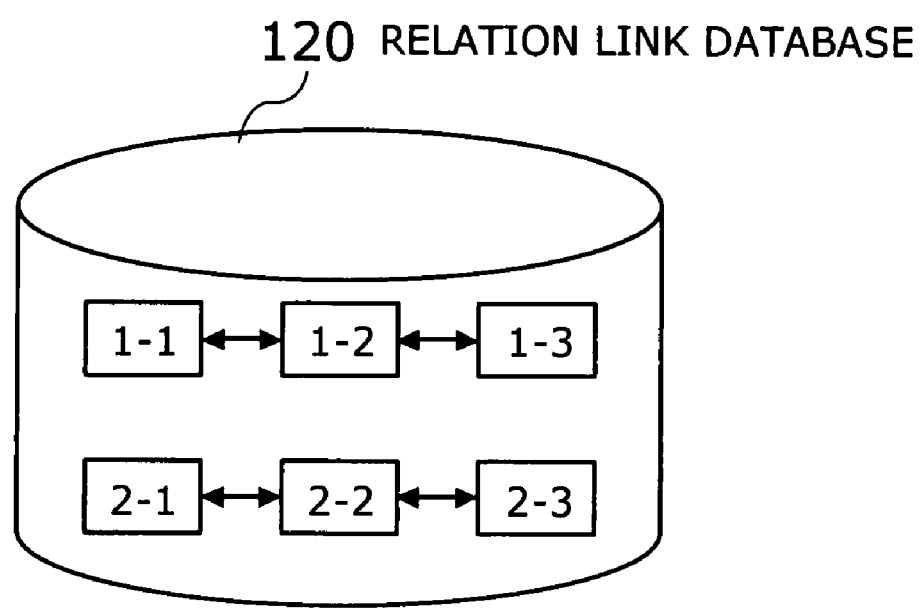
FIG. 7 shows an example data structure of a relation link database.

Relationships between parallel texts are managed by the relation link database 120. FIG. 7 shows an example data structure of the relation link database 120. The relation link database 120 contains parallel text identifiers, together with links between them. In the example of FIG. 7, relation links are each represented by an arrow. A rightward arrow shows a relation link from an upper-class parallel text to a lower-class parallel text. A leftward arrow shows a relation link from a lower-class parallel text to an upper-class parallel text. For example, the parallel text "1-1" is associated with a parallel text "1-2" at a lower class, and that parallel text "1-2" is associated with a parallel text "1-3" at a yet lower class.

While FIG. 7 shows relation links in arrow form, the relation link database 120 stores a relation link as a piece of information added to the identifier of a source parallel text. Specifically, in the relation link database 120, a relation link from one parallel text to another parallel text is established by adding the identifier of the latter parallel text to that of the former parallel text, along with a flag indicating whether the latter is upper or lower than the former.

Parallel texts may each have two or more downward links while those shown in the example of FIG. 7 have only one such link. As to the other direction, it is inherently impossible for a parallel text to have more than one upward relation link.

Figure 8:
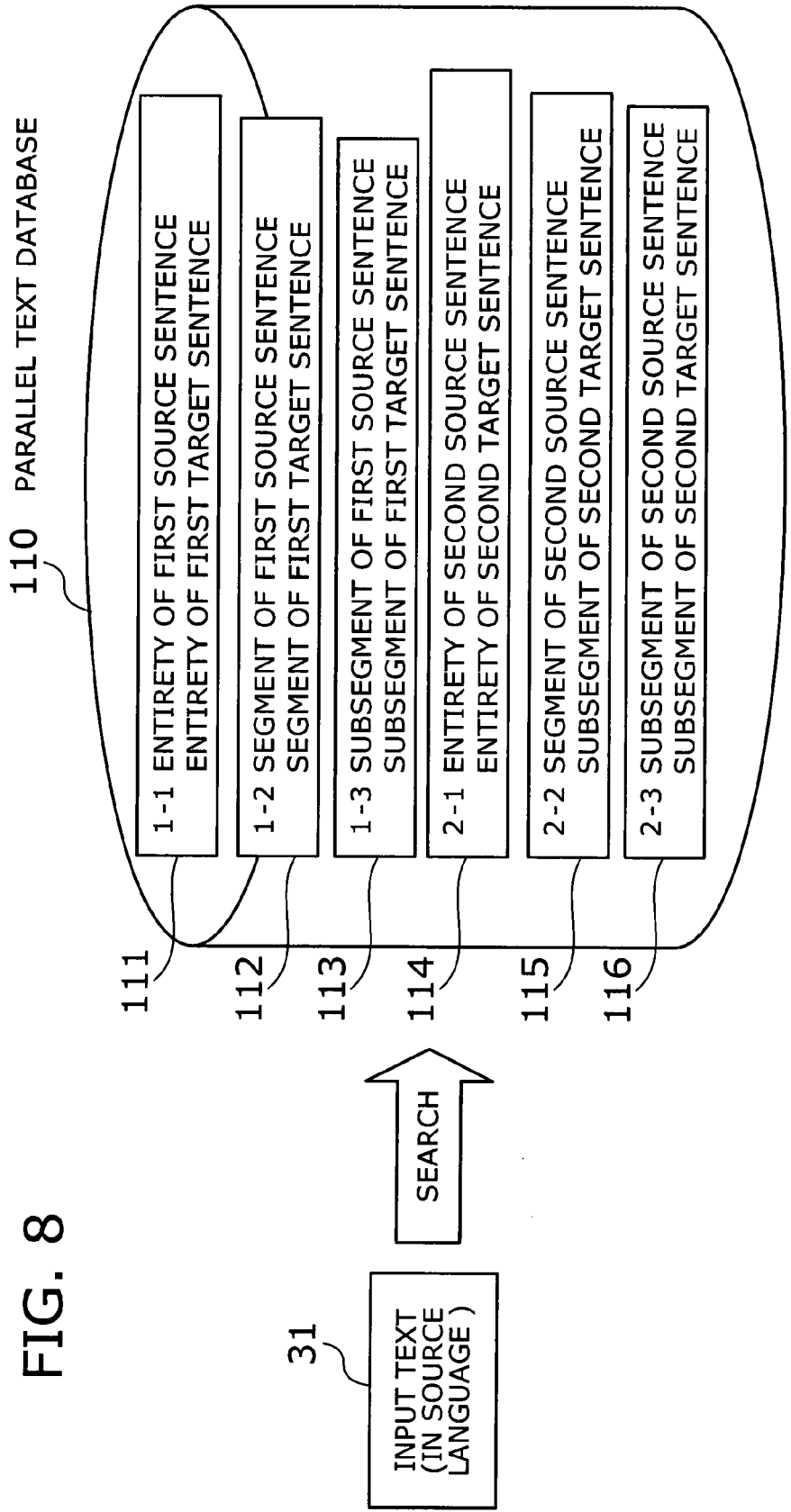
FIG. 8 shows an input text being compared with entries of the parallel text database.

With the databases shown in FIGS. 6 and 7, a translation memory search is initiated by an entry of an input text. FIG. 8 shows an input text 31 being compared with entries of the parallel text database 110. The input text 31 is written in Japanese, the source language in the present embodiment. Upon receipt of this input text 31, the search processor 132 begins an initial search of the parallel text database 110 by using the input text 31 as a search key. This initial search retrieves every parallel text whose source text part contains at least one character that matches with the input text 31. The retrieved parallel texts are passed to the match rate calculator 133, along with the input text 31.

Figure 9:
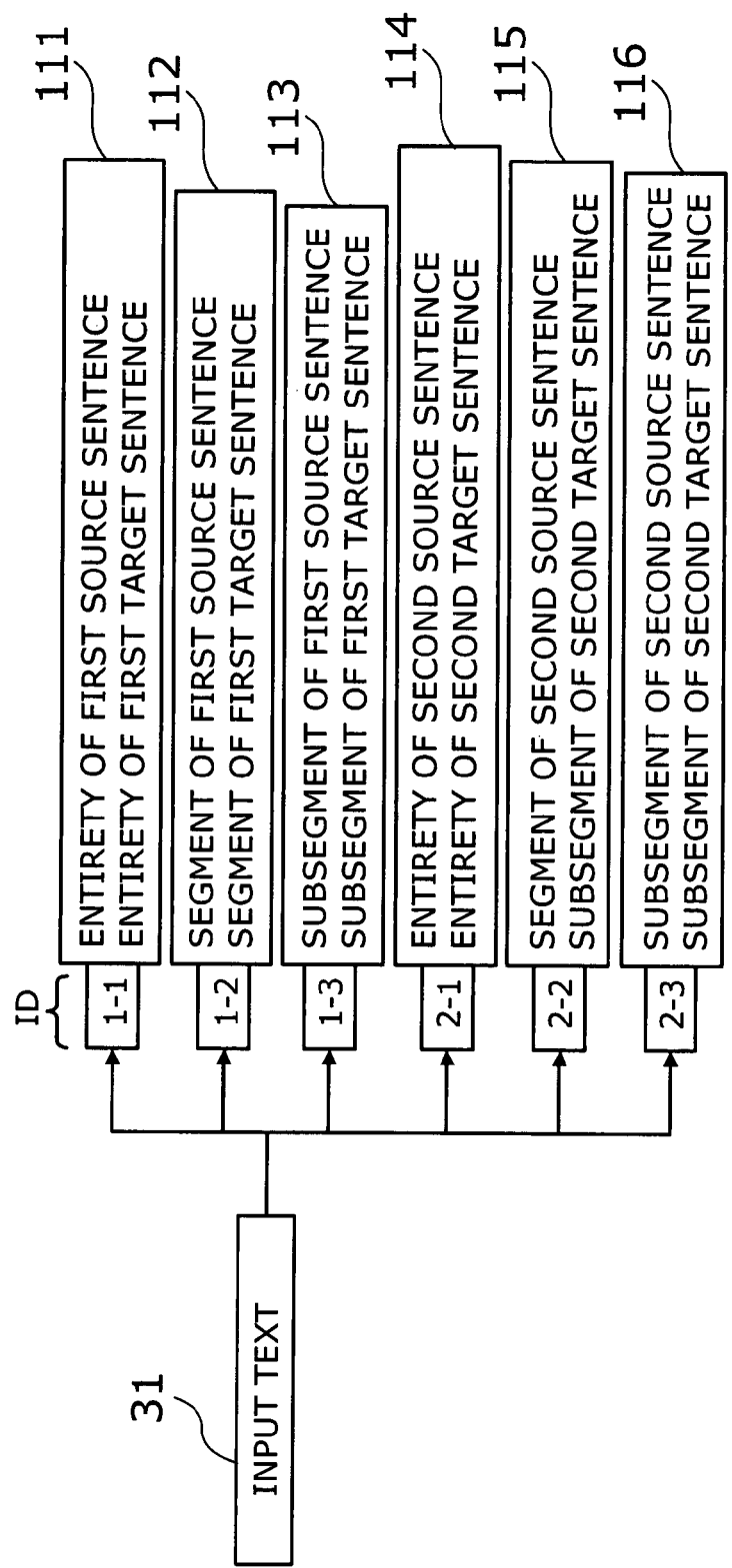
FIG. 9 shows data passed to a match rate calculator.

FIG. 9 shows what data is passed to the match rate calculator 133. Specifically, six parallel texts 111 to 116 have been retrieved from the parallel text database 110. That is, those parallel text 111 to 116 contain at least one of the characters constituting the input text 31.

Figure 10:
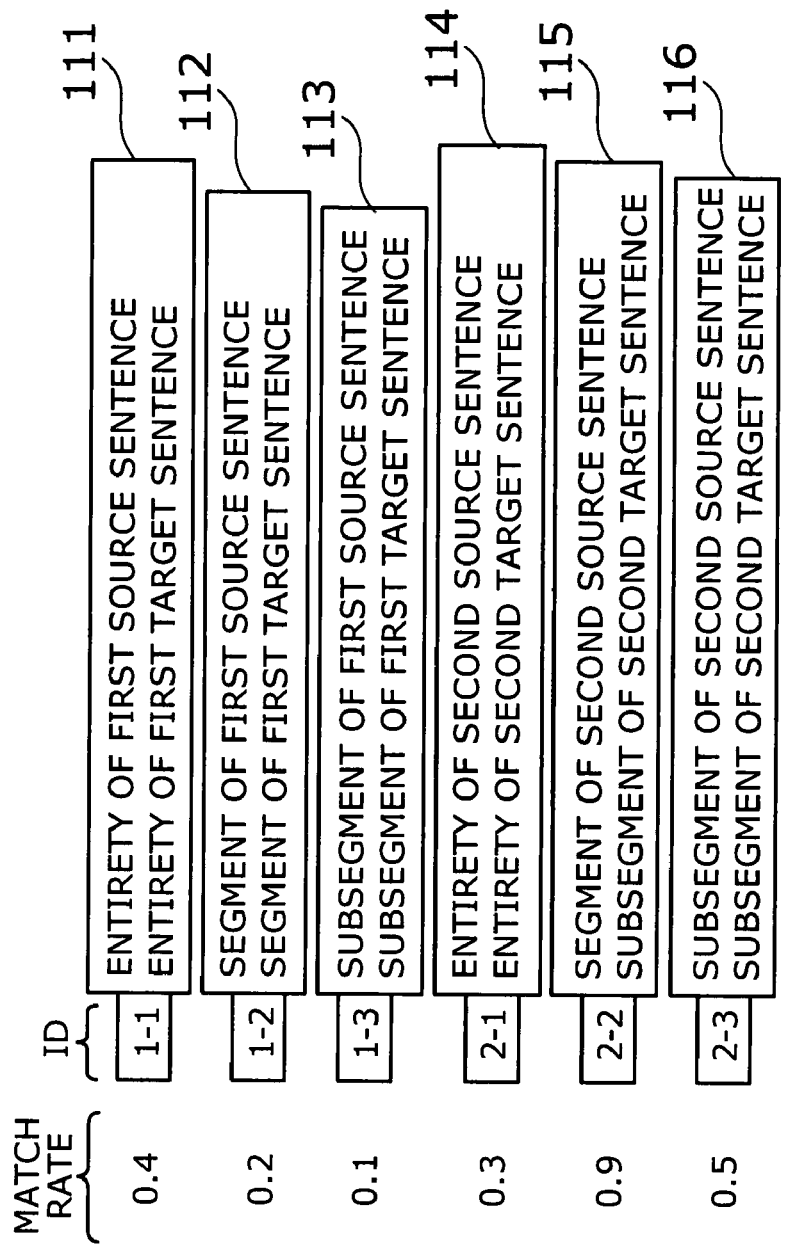
FIG. 10 shows match rates that are calculated.

The match rate calculator 133 receives from the search processor 132 the retrieved parallel texts 111 to 116 with respective identifiers, in addition to the input text 31. The match rate calculator 133 calculates a match rate of each parallel text 111 to 116 with respect to the input text. FIG. 10 shows the result of this calculation. The match rate calculator 133 then sends those parallel texts to the sorter 134, each with a calculated match rate.

Figure 11:
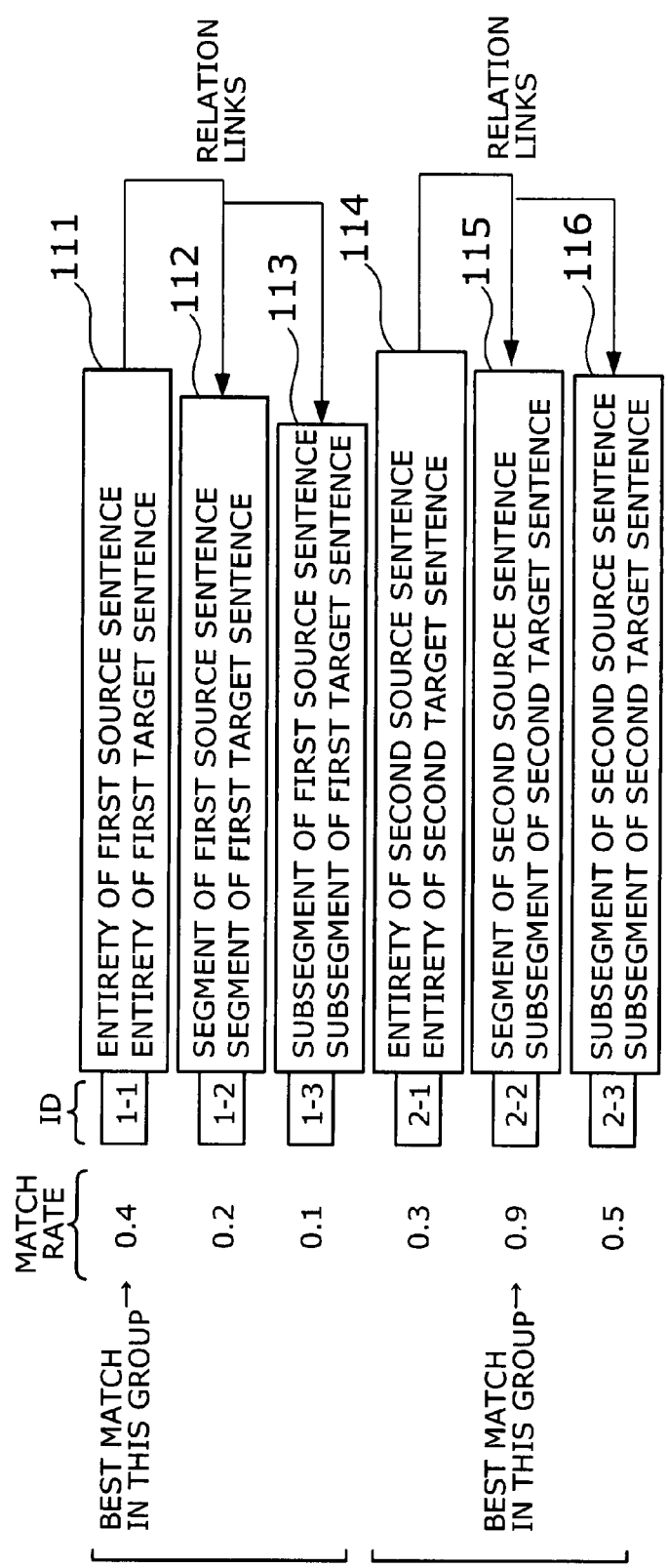
FIG. 11 shows groups of parallel texts.

The sorter 134 consults the relation link database 120 to trace relation links between the parallel texts 111 to 116. Specifically, the sorter 134 searches the relation link database 120 for the identifier of each specific parallel text, thereby finding relation link entries associated with that identifier. The sorter 134 uses the found relation links to compile one or more groups of interrelated parallel texts. The result is referred to as "parallel text groups." FIG. 11 shows two such groups. In this example, three parallel texts 111 to 113 are combined by their relation links, thus forming a single parallel text group. Another group is formed in a similar way from three parallel texts 114 to 116.

Then from among each parallel text group, the sorter 134 chooses a best match as a representative parallel text of that group. In the example of FIG. 11, the parallel texts 111 and 115 are chosen from their respective groups. Subsequently the sorter 134 sorts the parallel text groups according to the match rates of their respective representative parallel texts.

Figure 12:
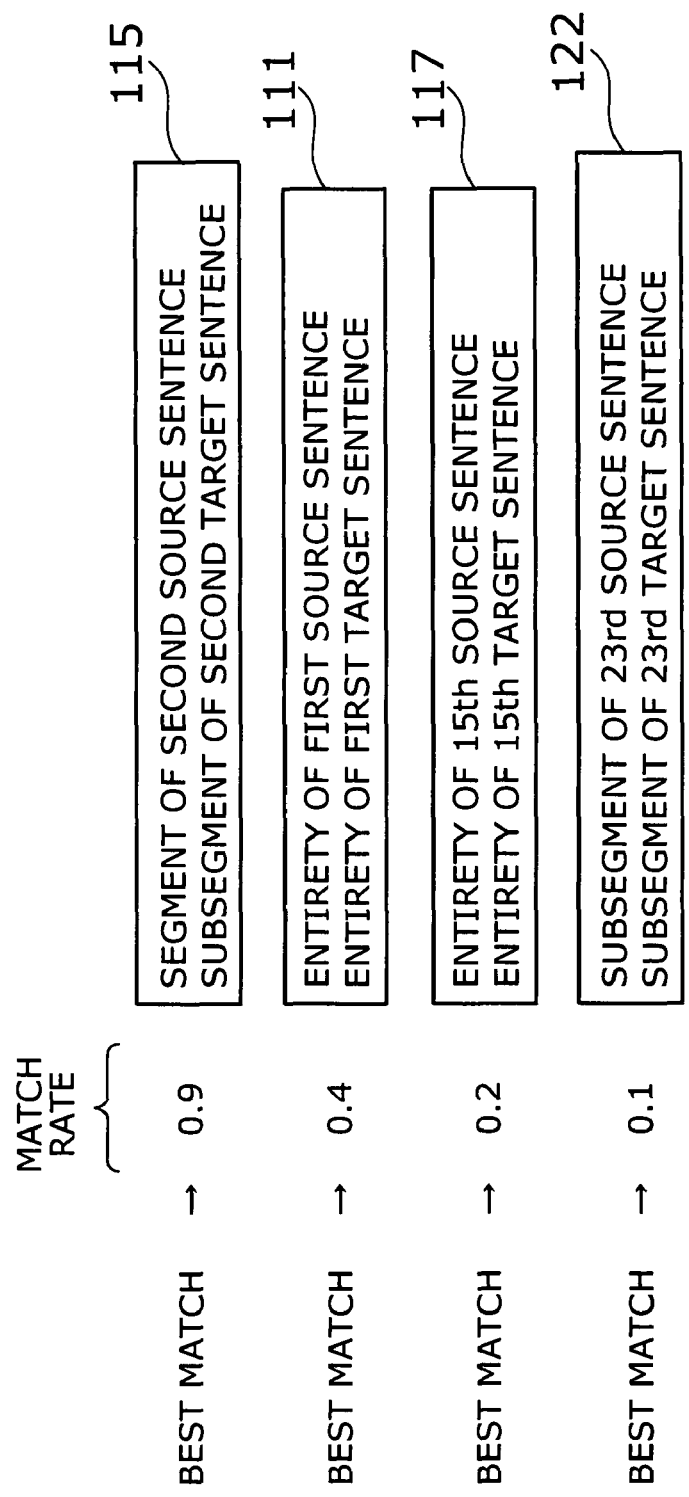
FIG. 12 shows a result of sorting.

FIG. 12 shows a sort result, where four representative parallel texts 111, 115, 117, and 122 have been sorted in descending order of match rate. As this example shows, the translation memory system extracts a best matching parallel text from each parallel text group and sorts the resulting collection of best matches according to their match rates.

Relation links associate each sorted representative parallel text with other parallel texts in the same group. When a parallel text is displayed on a screen, an upward relation link is placed at the left of the parallel text, and a downward relation link is placed at the right. The user may select the left link, causing the system to expand the view range (i.e., the user can view a larger portion of the parallel text). Selecting the right link causes the system to shrink the view range (i.e., the user will view a narrower portion of the parallel text).

Figure 13:
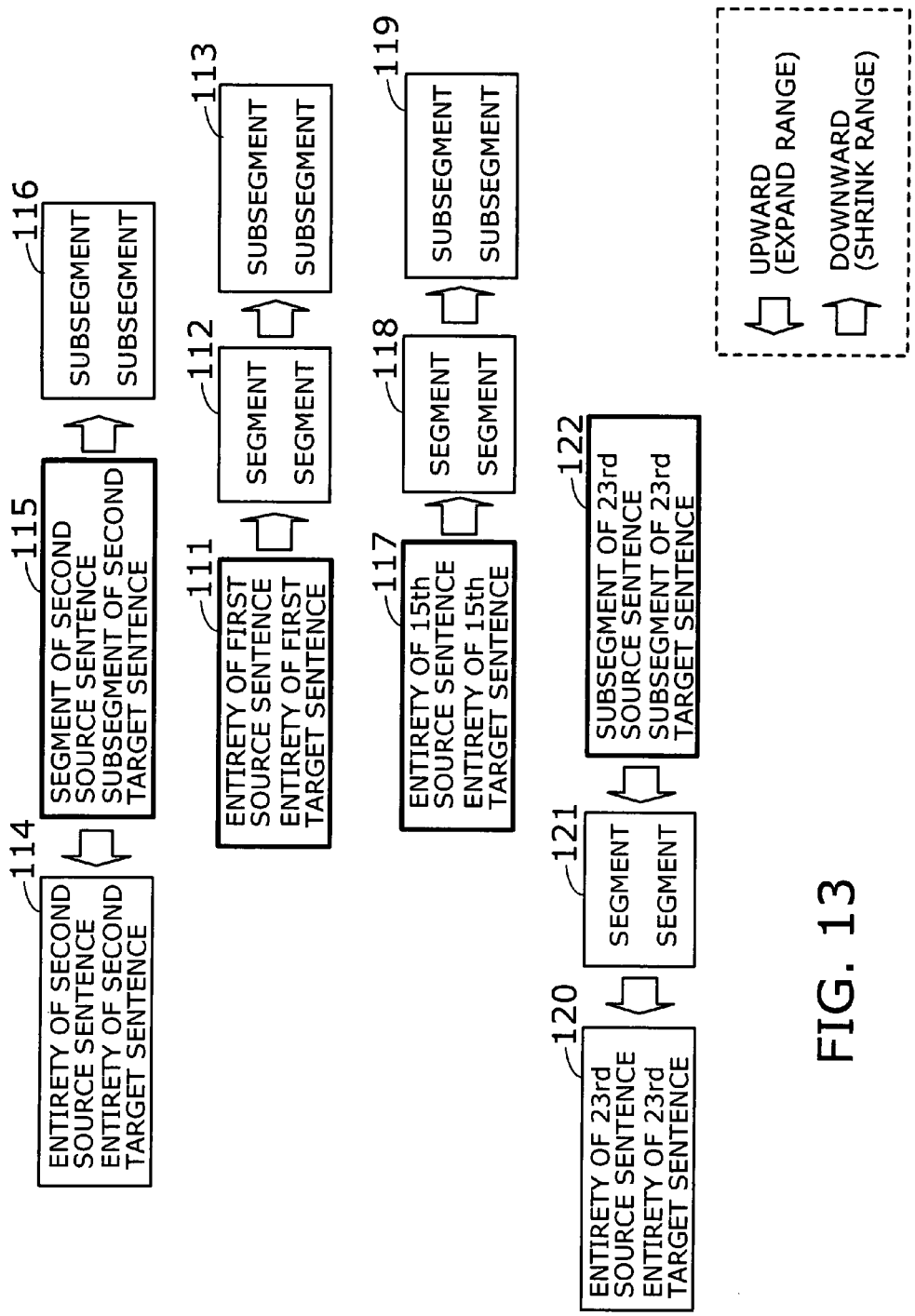
FIG. 13 shows retrieved parallel texts with relation links.

FIG. 13 shows retrieved parallel texts being displayed with their relation links. Suppose that parallel texts 115, 111, 117, and 122 (bold squares) have been selected from different parallel text groups for viewing on a screen. Shown on the left of those parallel texts 115, 111, 117, and 122 are their upper-class parallel texts, and shown on the right are their lower-class parallel texts.

The topmost row of FIG. 13, for example, shows a parallel text 115 including a segment of the second source sentence and its corresponding segment of the second target sentence. Linked to the left end of this parallel text 115 is an upper-class parallel text 114 including the entirety of the second source sentence and target sentence. Linked to the right end of the parallel text 115 is a lower-class parallel text 116 including a subsegment of the second source sentence and a corresponding subsegment of the second target sentence.

Figure 14:
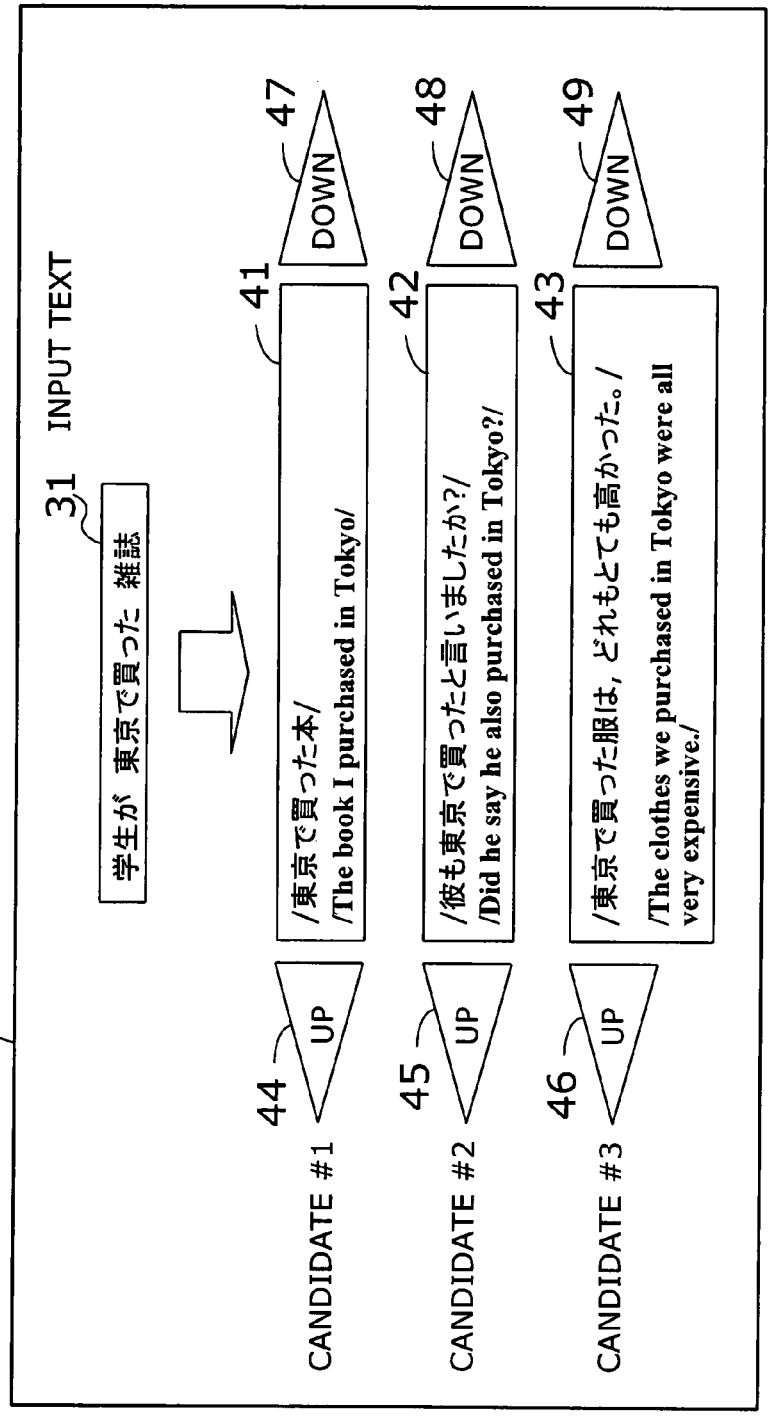
FIG. 14 shows an example search result screen.

FIG. 14 shows an example of a search result screen. This search result screen 40 is an outcome of a series of processing operations (i.e., database searching, match rate calculation, sorting, and linking) on an input text 31. Initially the search result screen 40 shows representative parallel texts 41 to 43 retrieved as being similar to the given input text 31. The parallel text 41 to 43 are arranged from top to bottom in descending order of the similarity.

Attached to the right and left of each parallel text 41 to 43 are buttons 44 to 49 representing relation links. The left buttons 44, 45, and 46 are labeled "UP" to indicate that they are used to bring the view range of a parallel text to an upper level. The right buttons 47, 48, and 49 are, on the other hand, are labeled "DOWN" to indicate that they are used to bring the view range of a parallel text to a lower level. A single parallel text may have two or more lower-class parallel texts. If this is the case, pressing the DOWN button will cause the search result screen to show multiple lower-class parallel texts in place of the current parallel text.

Figure 15:
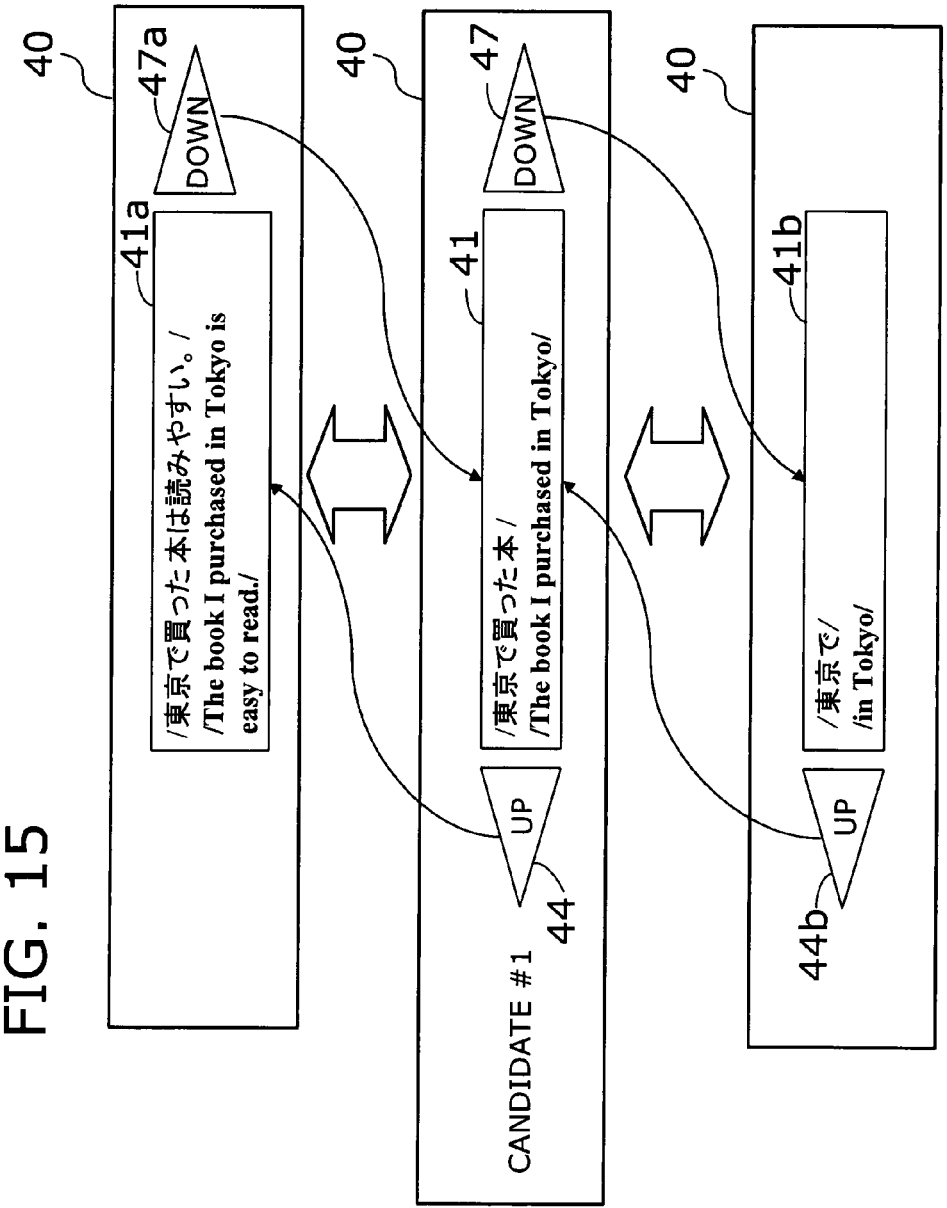
FIG. 15 shows an example of expanding and shrinking of view ranges.

FIG. 15 shows an example of expanding and shrinking of view ranges. Suppose that, in the search result screen 40, the user has pressed an UP button 44. This action replaces the current parallel text 41 with a new parallel text 41a that is pointed at by the upward relation link of the parallel text 41. The newly displayed parallel text 41a is formed from the entire source sentence and its translation. That is, the parallel text 41a is located at the topmost level in the hierarchy of its parallel text group. This is why the parallel text 41a lacks UP buttons. The parallel text 41a, instead, has a DOWN button 47a to allow the user to go back to the parallel text 41.

Pressing the DOWN button 47, on the other hand, allows the user to go down to the segment class, thus replacing the parallel text 41 with a new parallel text 41b. This segment-class parallel text 41b is a subset of its parent sentence-class parallel text 41. The parallel text 41b is at the bottommost level within the parallel text group it belongs to, and thus it lacks DOWN buttons. The parallel text 41b has a UP button 44b to allow the user to go back to the parallel text 41.

The search result screen shows highly matched parallel texts for a given input text 31 in the way described above. The translation memory search attempts to find matches not only for the entire input text 31, but also for its segments. Thus the user has a better chance for finding a useful text in the search result.

The search result screen also allows the user to expand or shrink the view range of a parallel text by simply pressing a button. When a parallel text appears on a screen, the user may not be able to determine immediately whether it is useful for his/her translation work. In such a case, the user presses an UP button to view the text in greater detail or clicks a DOWN button to focus on the text portion that matches with the input text 31.

Second Embodiment

Figure 16:
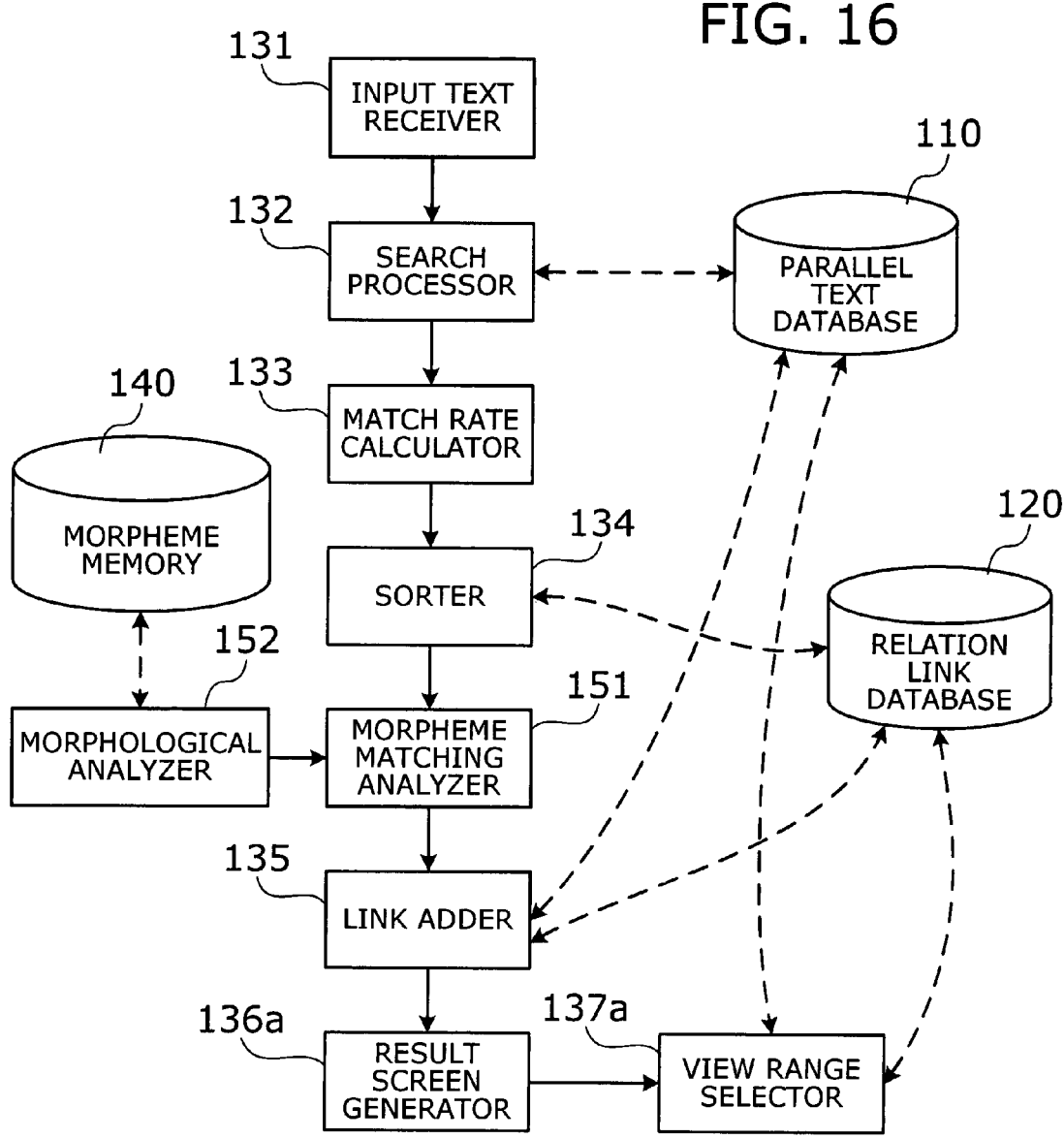
FIG. 16 is a block diagram showing functions of a translation memory system according to a second embodiment of the present invention.

This section describes a second embodiment of the present invention. The second embodiment displays retrieved parallel texts with some emphasis on matched words, such that the user can see at a glance which part of the source text displayed on a search result screen matches with the input text. FIG. 16 is a block diagram showing functions of a translation memory system according to the second embodiment of the present invention. Many of the elements shown in FIG. 16 have the same functions as those in the first embodiment of FIG. 3. The following description will focus on new or modified elements while assigning like reference numerals to like elements.

The second embodiment differs from the first embodiment in that a morpheme memory 140, a morpheme matching analyzer 151, and a morphological analyzer 152 are included as additional elements. Further, the second embodiment has a result screen generator 136a and a view range selector 137a as an enhanced version of the result screen generator 136 and view range selector 137 according to the first embodiment.

The morpheme memory 140 stores a collection of morphemes of Japanese language. This collection provides each morpheme of Japanese vocabulary, along with its part of speech. A storage space of the HDD 103, for example, may be allocated for this purpose.

The morpheme matching analyzer 151, inserted between the sorter 134 and link adder 135, seeks morphemes that exist in both a given input text and relevant parallel texts that are sorted. Specifically, upon receipt of an input text and retrieved parallel texts from the sorter 134, the morpheme matching analyzer 151 asks the morphological analyzer 152 to analyze them into morphemes, or smallest linguistic units that have semantic meaning. The morpheme matching analyzer 151 receives the result of this morphological analysis from the morphological analyzer 152. The result shows what specific words (or morphemes) constitute the input text or each parallel text. The morpheme matching analyzer 151 then compares a sequence of morphemes constituting the input text with those of each parallel text, thereby recognizing a morpheme sequence common to both texts. The morpheme matching analyzer 151 passes the input text and parallel texts to the link adder 135, together with the matched morpheme sequences. In this process, the morpheme matching analyzer 151 assigns a common identifier to associated morpheme sequences.

As already mentioned, the morphological analyzer 152 performs a morphological analysis on the input text and the source sentence or source segment of each parallel text supplied from the morpheme matching analyzer 151. Specifically, the morphological analyzer 152 consults a collection of morphemes stored in the morpheme memory 140 to divide each given text into a plurality of morphemes. More specifically, the morphological analyzer 152 selects characters one by one, from the top of a given sentence, and if the selected character string matches with an entry of the morpheme collection, it extracts the character string as a morpheme. There may be, however, two or more ways to divide the same text. If there are such multiple division patterns, then the morphological analyzer 152 identifies a most plausible pattern, taking into consideration the part of speech of each morpheme. The morphemes obtained in this way are supplied back to the morpheme matching analyzer 151 as an analysis result.

The result screen generator 136a has basically the same function as the result screen generator 136 of the first embodiment. That is, they display retrieved parallel texts on a search result screen. The result screen generator 136a of the second embodiment, however, can further place emphasis on some morphemes associated with those of an input text by, for example, adding an underline to them.

The view range selector 137a is similar to the view range selector 137 of the first embodiment in that it changes the view range of a retrieved parallel text. In addition to this function, the view range selector 137a of the second embodiment provides the function of placing visual emphasis on the morphemes that match with a given input text, when it updates the search result screen with an expanded or shrunk view range. The emphasis may be given by, for example, adding an underline to them.

Figure 17:
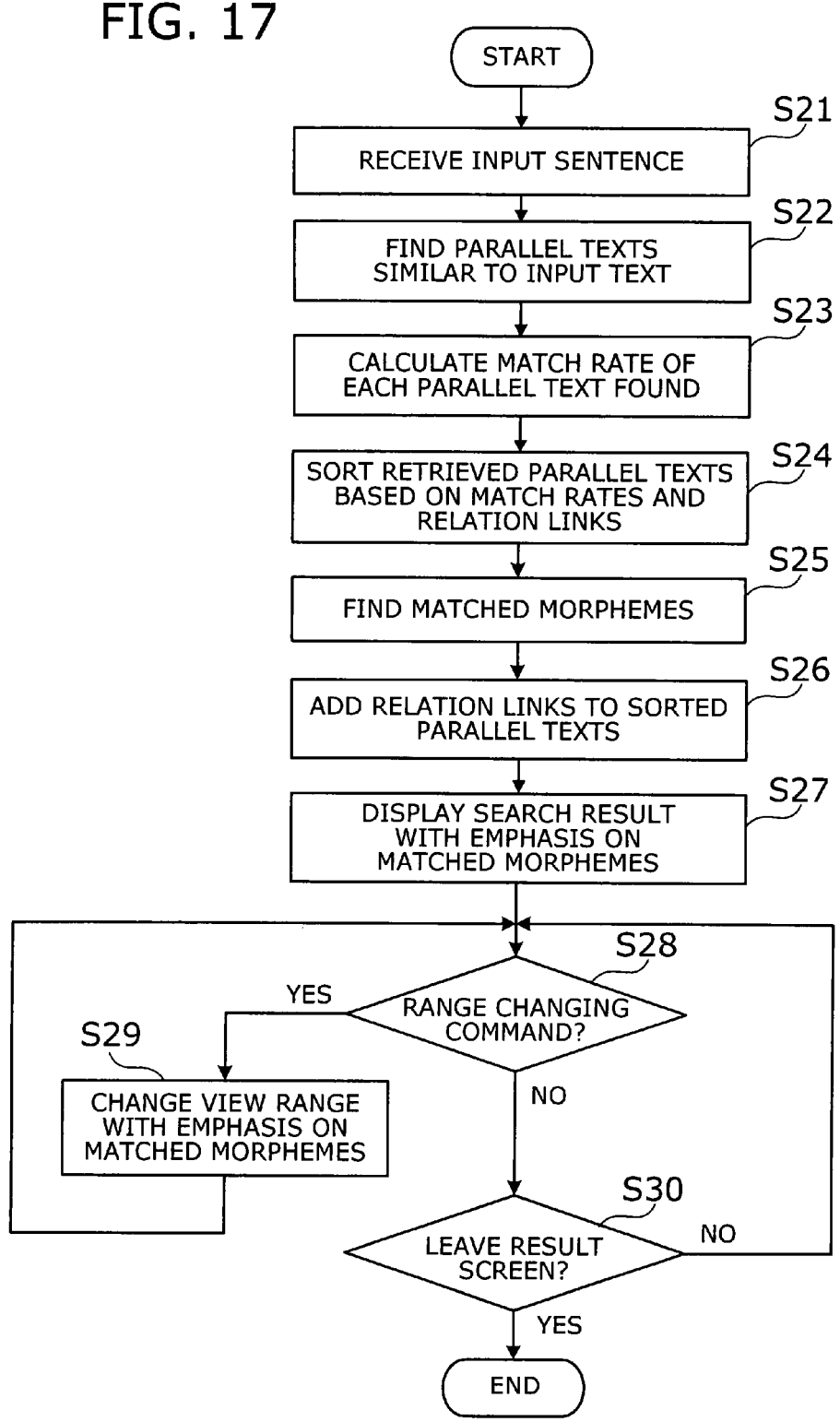
FIG. 17 is a flowchart of a translation memory search according to the second embodiment.

FIG. 17 is a flowchart of a translation memory search according to the second embodiment. This process proceeds according to steps S21 to S30. Steps S21 to S24, S26, S28, and S30 are equivalent to steps S11 to S15, S17, and S19 of the first embodiment. The following description will focus on other steps that are different from the first embodiment.

(Step S25) The morpheme matching analyzer 151 causes the morphological analyzer 152 to divide the input text or a source sentence or segment contained in each retrieved parallel text into morphemes. The morpheme matching analyzer 151 compares morphemes constituting the input text with those constituting the source sentence or segment of each parallel text, thereby recognizing morphemes common to the both texts being compared. The morpheme matching analyzer 151 then supplies the link adder 135 with the input text and retrieved parallel texts, together with matched morphemes.

After step S26, the link adder 135 adds relation links to the sorted parallel texts and passes them all to the result screen generator 136a.

(Step S27) The result screen generator 136a displays the parallel texts, with emphasis on the morphemes that match with the input text. What can be viewed on the monitor screen at this step are representative parallel texts, or best matches, that have been selected out of each parallel text group.

Subsequently the process advances to step S29 upon receipt of a user command for expanding or shrinking the view range.

(Step S29) According to the user command, the view range selector 137a expands or shrink the range of the currently displayed parallel text by replacing it with a specified upper-level or lower-class parallel text, thus refreshing the search result screen. The result screen generator 136a again emphasizes matched morphemes. The process then returns to step S28.

Referring now to FIGS. 18-22, the following will give more details about how the text is analyzed at a morpheme level.

Figure 18:
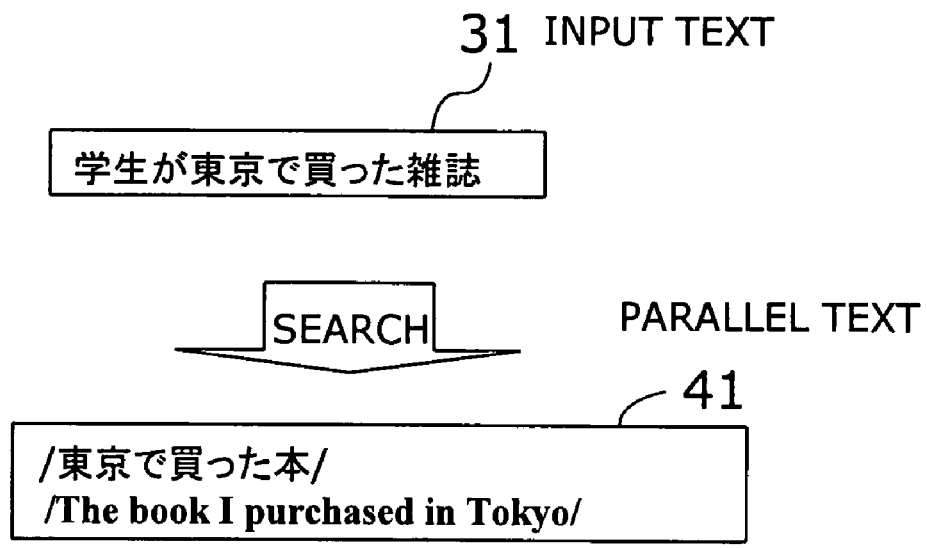
FIG. 18 shows an example of morpheme search.

FIG. 18 shows an example of morpheme search. It is assumed in this example that the translation memory system has received an input text 31 that reads "学生が東京で買った雑誌" ("Gakusei ga Tokyo de katta zasshi") in Japanese and retrieved a segment-class parallel text 41 that reads "東京で買った本" ("Tokyo de katta hon"), where the text in parentheses gives a romanized version of the preceding Japanese text for reference purposes. The morphological analyzer 152 analyzes the input text 31 and parallel text 41 to divide them into morphemes.

Figure 19:
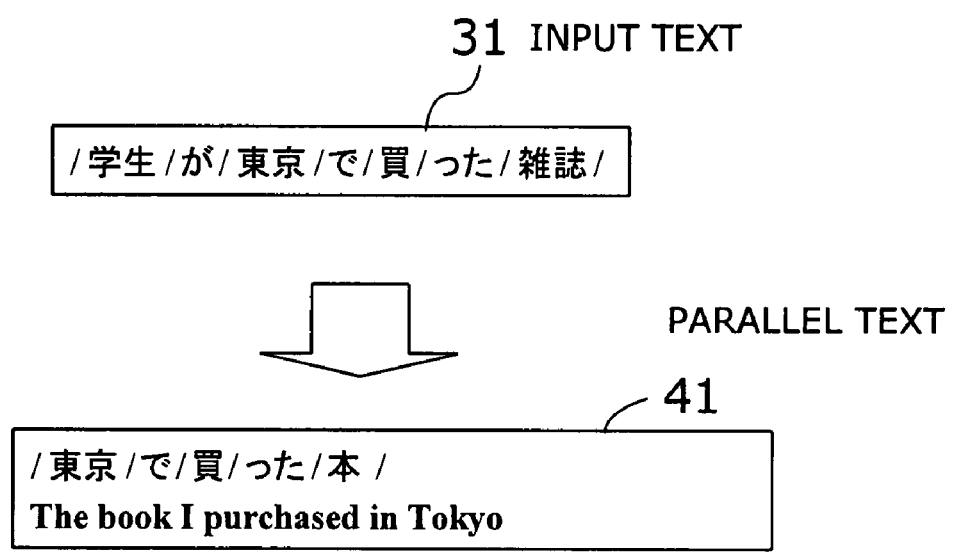
FIG. 19 shows how a sentence is divided into morphemes.

FIG. 19 shows how a sentence is divided into morphemes. In this example of FIG. 19, the input text 31 is divided into morphemes separated by slash ("/") as delimiter, as in "/学生/が/東京/で/買/った/雑誌/" (/Gakusei/ga/Tokyo/de/katta/zasshi/). Likewise, the parallel text 41 at a segment level is divided into morphemes by the delimiter "/" as in "/東京/で/買/った/本" (/Tokyo/de/ka/tta/hon/). The translation memory system compares the input text 31 with the parallel text 41 on a morpheme by morpheme basis, thereby extracting every matched morpheme.

Figure 20:
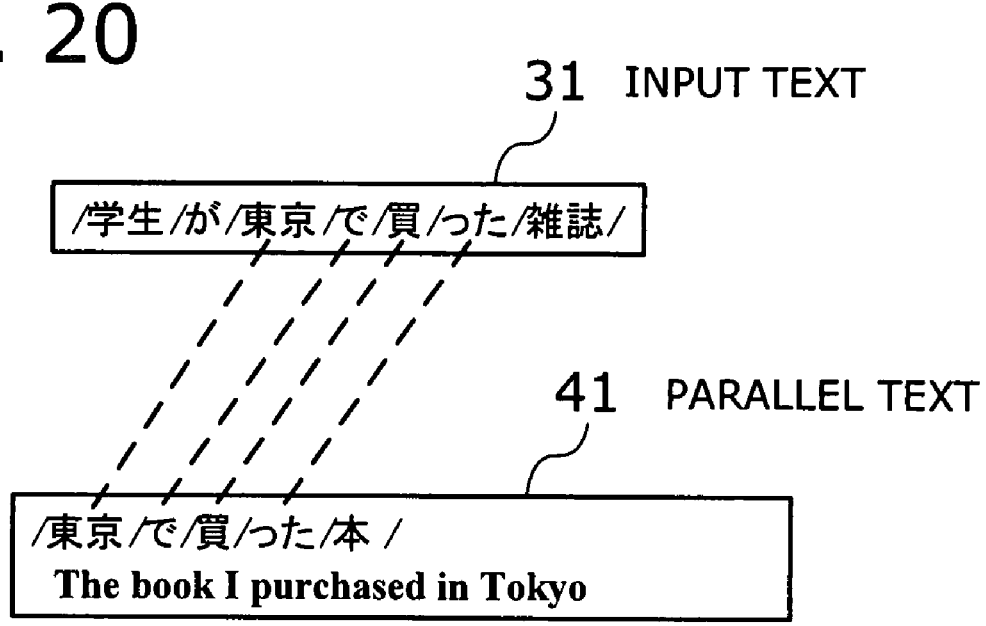
FIG. 20 shows matched morphemes that are found.

FIG. 20 shows the matched morphemes that are found, in which the alignment between morphemes is represented by broken lines. Specifically, the two texts share the following four morphemes: "東京","で","買",and "った" ("Tokyo", "de", "ka", "tta"). Those morphemes are each attached an emphasis flag (not shown) indicating their status as matched morphemes. Those emphasis flags cause the result screen generator 136a to add visual emphasis on the corresponding morphemes when it displays the input text 31 and parallel text 41 on a screen.

Figure 21:
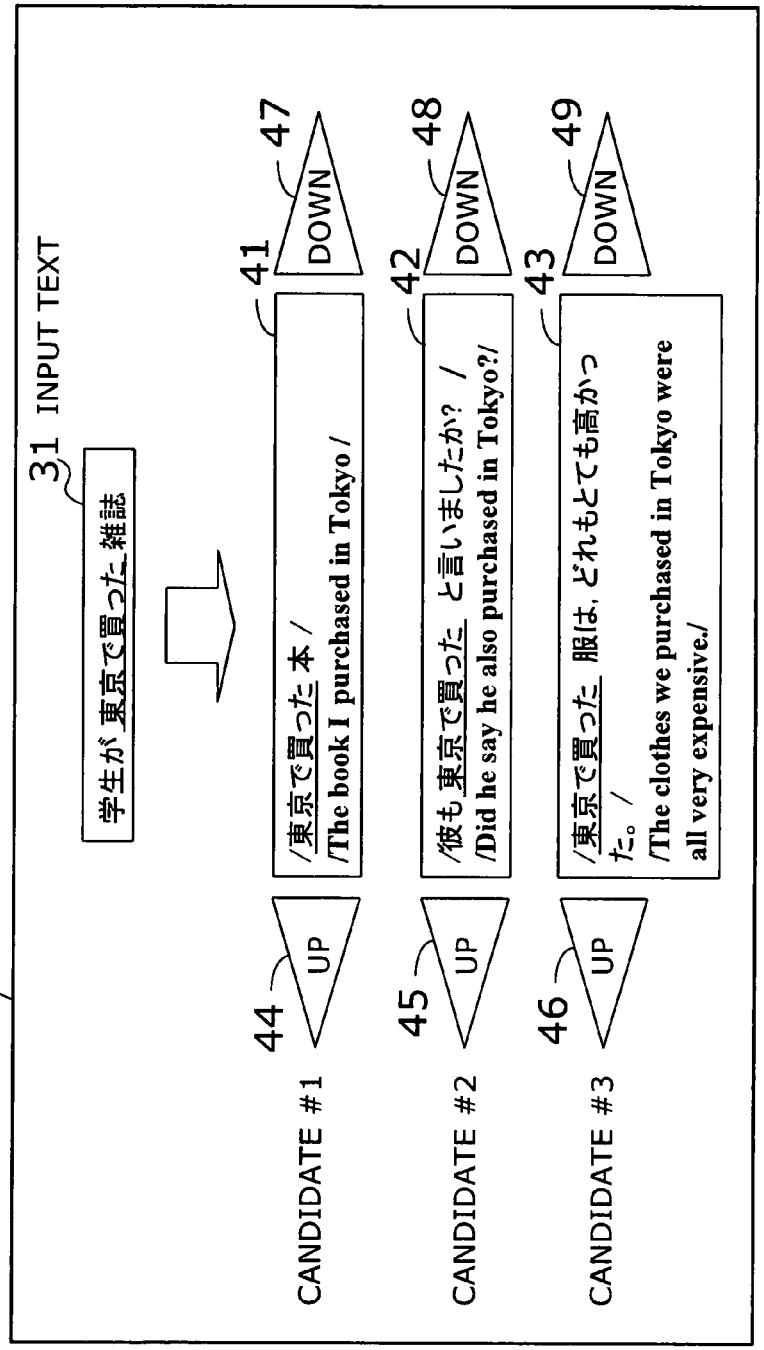
FIG. 21 shows an example of emphasis placed on matched morphemes.

FIG. 21 shows an example of emphasis placed on matched morphemes. Specifically, the second embodiment provides a search result screen 40a showing the input text 31 and parallel texts 41 to 43 with visual emphasis (i.e., underline in this example) on their matched morphemes.

Figure 22:
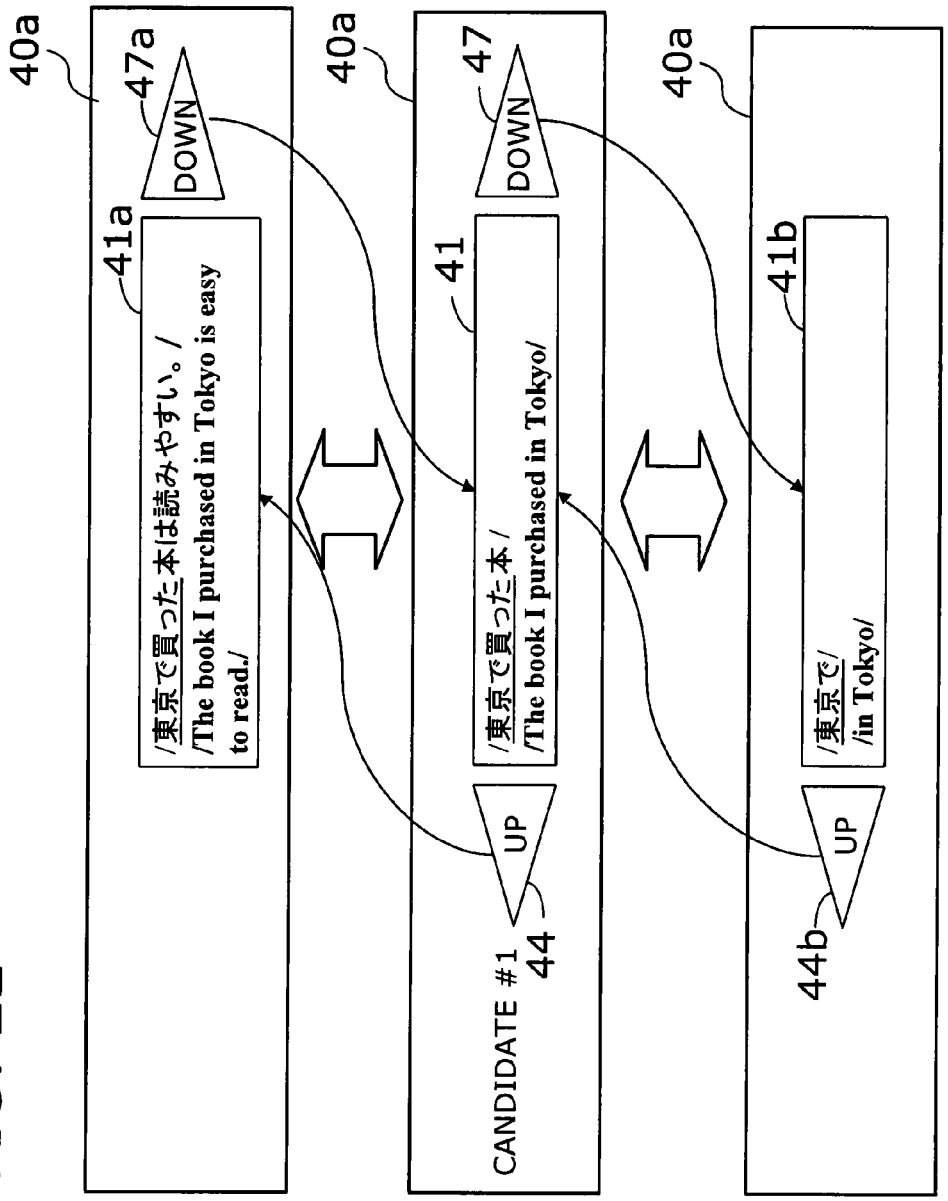
FIG. 22 shows an example of expanding and shrinking of view ranges according to the second embodiment.

The user may press a button to change the view range of a parallel text. In that case, a newly displayed parallel text with an expanded or shrunk range will also have their matched morphemes emphasized. FIG. 22 shows an example of such view range selection according to the second embodiment of the invention. The search result screen 40a gives emphasis on morphemes that match with the input text 31 even for non-representative parallel texts, thus making it easier for the user to identify which part of the retrieved text can be used for his/her translation work.

Third Embodiment

This section describes a translation memory system according to a third embodiment of the present invention. The third embodiment differs from the second embodiment in its function of emphasizing not only a source text portion, but also its counterpart in the translation.

Figure 23:
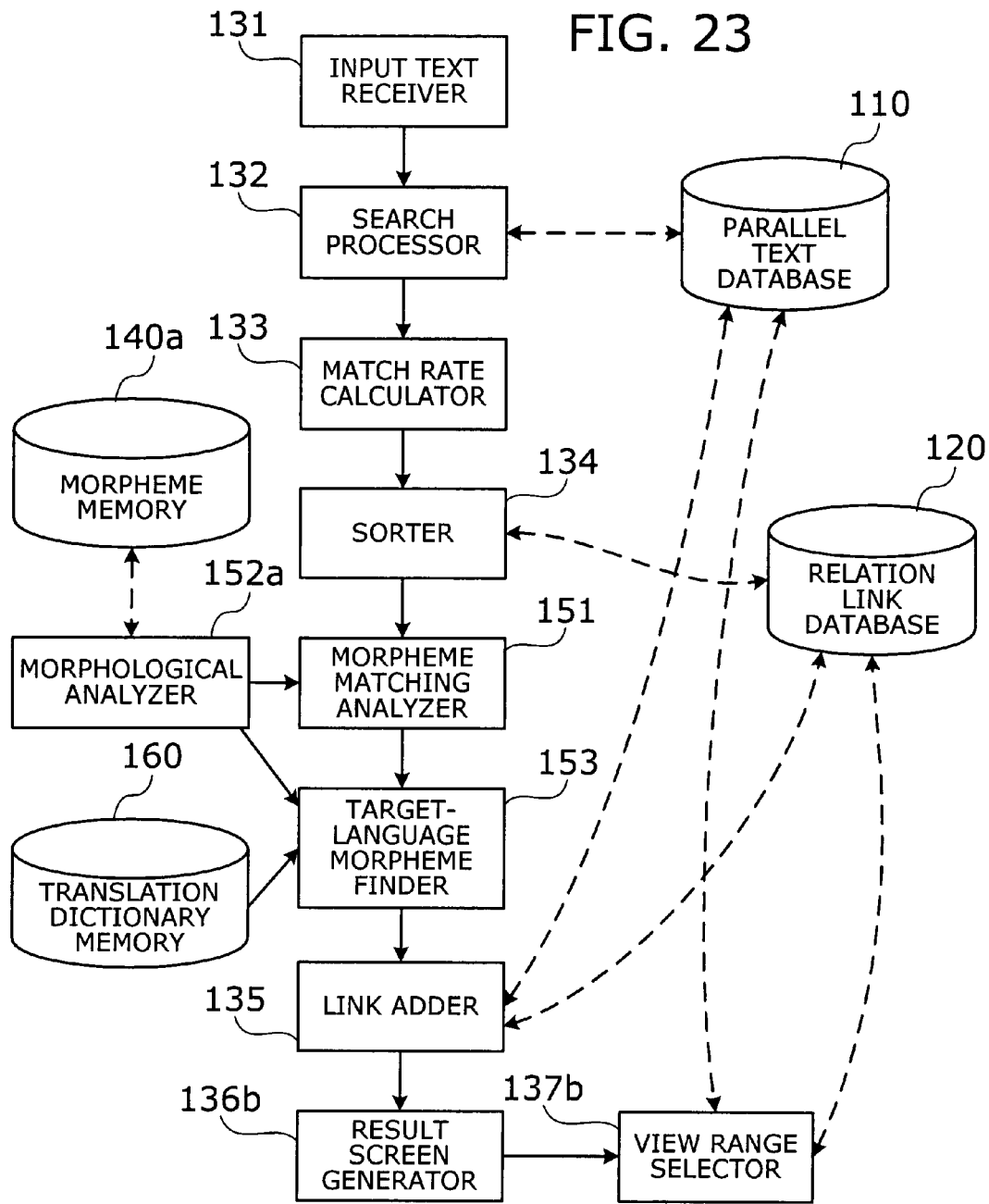
FIG. 23 is a functional block diagram of a translation memory system according to a third embodiment of the invention.

FIG. 23 is a functional block diagram of a translation memory system of the third embodiment. Many of the elements shown in FIG. 23 have the same functions as those discussed in the second embodiment of FIG. 16. The following description will, therefore, focus on new or modified elements, while assigning like reference numerals to like elements.

The translation memory system of the third embodiment includes a translation dictionary memory 160 and a target-language morpheme finder 153 in addition to all elements of the second embodiment. Further, the third embodiment employs a morpheme memory 140a, a morphological analyzer 152a, a result screen generator 136b, and a view range selector 137b which are more than equivalent to their counterpart in the second embodiment, i.e., the morpheme memory 140, morphological analyzer 152, result screen generator 136a, and view range selector 137a.

The translation dictionary memory 160 is a storage space for a translation dictionary containing source language vocabularies (e.g., Japanese) and their corresponding target language vocabularies (e.g., English). A storage space of the HDD 103, for example, may be allocated for this purpose.

The target-language morpheme finder 153 examines a retrieved parallel text to identify the part-to-part correspondence between the source text and target text. Specifically, the target-language morpheme finder 153 receives an input text and retrieved parallel texts from the morpheme matching analyzer 151, together with emphasis flags indicating coincidence with the input text at a morpheme level. The target-language morpheme finder 153 then consults the translation dictionary memory 160 to find target-language vocabularies corresponding to those matched morphemes.

The target-language morpheme finder 153 also requests the morphological analyzer 152a to analyze the target text part of each retrieved parallel text. The morphological analyzer 152a returns morphemes of the target text as the outcome of morphological analysis. The target-language morpheme finder 153 compares those morphemes with the target-language vocabularies that have been found in the translation dictionary memory 160. If there are matches, the target-language morpheme finder 153 sets an emphasis flag to each matched morpheme. Finally the target-language morpheme finder 153 supplies the link adder 135 with the input text and retrieved parallel texts, including emphasis flags attached to some part of them.

The morpheme memory 140a stores a collection of morphemes in the target language (English) in addition to the same in the source language (Japanese). The morphological analyzer 152a is basically equivalent to the morphological analyzer 152 of the second embodiment. In addition to that, the morphological analyzer 152a of the third embodiment analyzes a target text and divides it into morphemes by consulting the morpheme memory 140a, upon request from the target-language morpheme finder 153.

The result screen generator 136b produces a search result screen basically in the same way as the result screen generator 136a of the second embodiment. In addition to that, the result screen generator 136b of the third embodiment adds emphasis on target-language vocabularies corresponding to matched source-language morphemes when displaying a retrieved parallel text. For example, the result screen generator 136b gives an underline to the words that have an emphasis flag indicating their relevance to the input text at morpheme level.

The view range selector 137b controls the view range of a parallel text on a search result screen in the same way as the view range selector 137a of the second embodiment. In addition to that, the view range selector 137b of the third embodiment adds emphasis on target-language vocabularies corresponding to matched source-language morphemes when changing view ranges. For example, the view range selector 137b puts an underline on the words that have an emphasis flag indicating their relevance to the input text at morpheme level.

Figure 24:
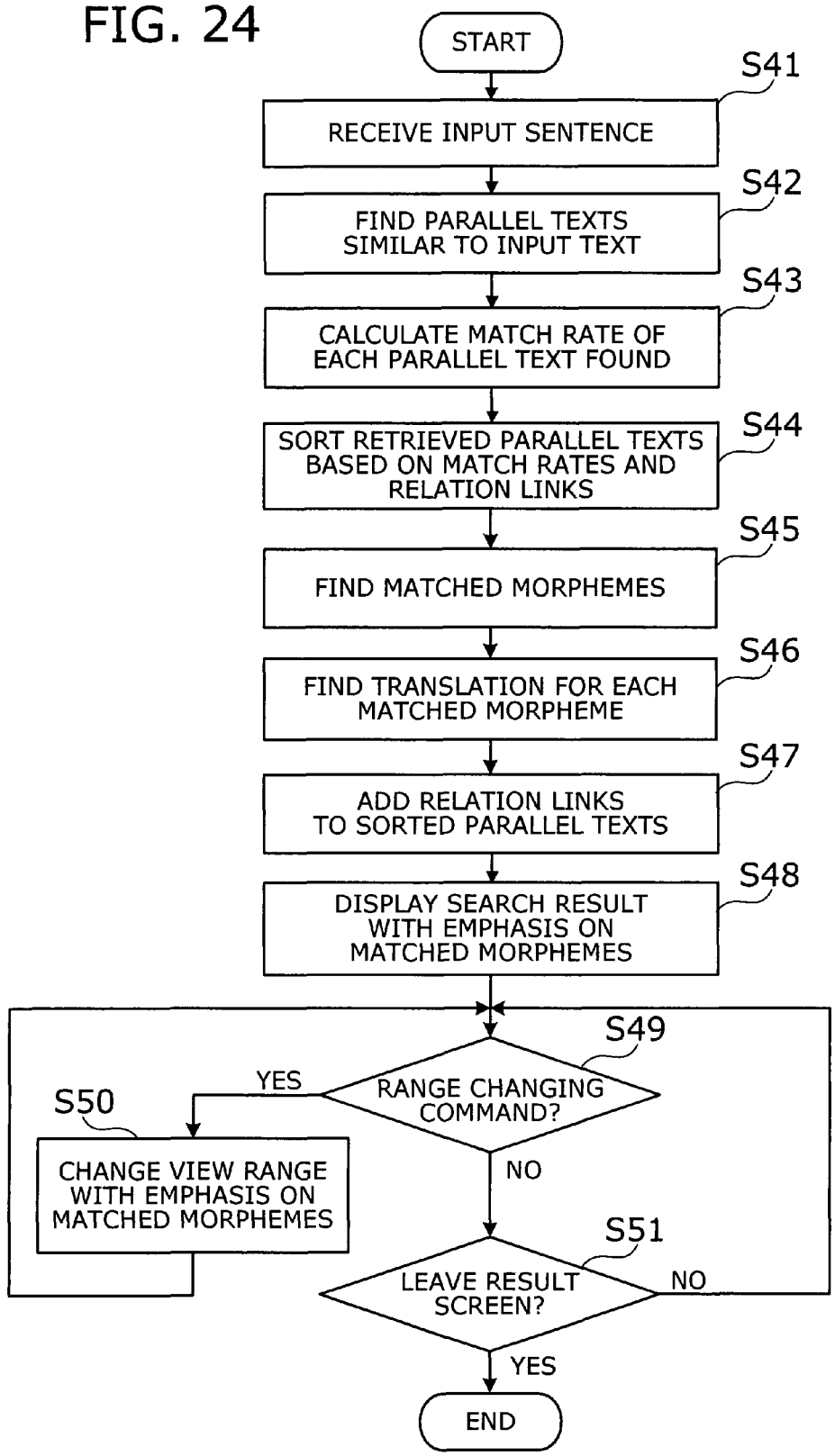
FIG. 24 is a flowchart of a translation memory search according to the third embodiment.

FIG. 24 is a flowchart of a translation memory search according to the third embodiment. This process proceeds according to steps S41 to S51. Steps S41 to S45, S47, S49, and S51 are equivalent to steps S21 to S26, S28, and S30 of the second embodiment shown in the flowchart of FIG. 17. The following description will focus on other steps that are different from the second embodiment.

(Step S46) The target-language morpheme finder 153 finds target-language morphemes corresponding to the matched source-language morphemes. More specifically, the target-language morpheme finder 153 asks the morphological analyzer 152a to analyze the target text part of each retrieved parallel text. The morphological analyzer 152a then divides the received target text into morphemes by consulting a target-language morpheme dictionary stored in the morpheme memory 140a. The morphological analyzer 152a sends those target-language morphemes back to the target-language morpheme finder 153. Upon receipt of this analysis result, the target-language morpheme finder 153 searches the translation dictionary in the translation dictionary memory 160 by using each source-language morpheme as a search key, thus finding a corresponding target-language word as the search result. The target-language morpheme finder 153 compares this search result with the target text part of each retrieved parallel text, thereby finding target-language morphemes corresponding to the source-language morphemes matching the input text. Lastly the target-language morpheme finder 153 associates the source-language morphemes matching the input text with their corresponding target-language morphemes that are found by, for example, giving a common identifier to each match.

After step S46, the link adder 135 adds relation links to the sorted parallel texts and passes them all to the result screen generator 136b.

(Step S48) The result screen generator 136b displays retrieved parallel texts, with emphasis on source-language morphemes matching the input text, as well as on their associated target-language morphemes. What can be viewed on the monitor screen at this step are representative parallel texts, or best matches, that have been selected out of each parallel text group.

Subsequently the process advances to step S50 upon receipt of a user command for expanding or shrinking the view range.

(Step S50) According to the user command, the view range selector 137b expands or shrink the range of the currently displayed parallel text, thus refreshing the search result screen with an upper-level or lower-class parallel text. The view range selector 137b displays a newly selected parallel text, with emphasis on source-language morphemes matching the input text, as well as on their corresponding target-language morphemes. The process then returns to step S49.

Figure 25:
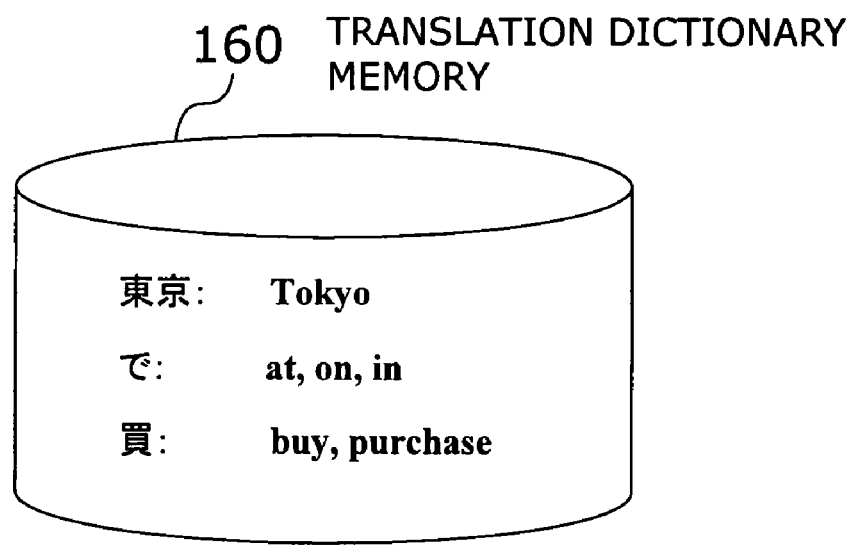
FIG. 25 shows an example of a translation dictionary memory.

FIG. 25 shows an example of a translation dictionary memory. The illustrated translation dictionary memory 160 stores bilingual entries each containing one or more English words corresponding to a Japanese word.

Figure 26:
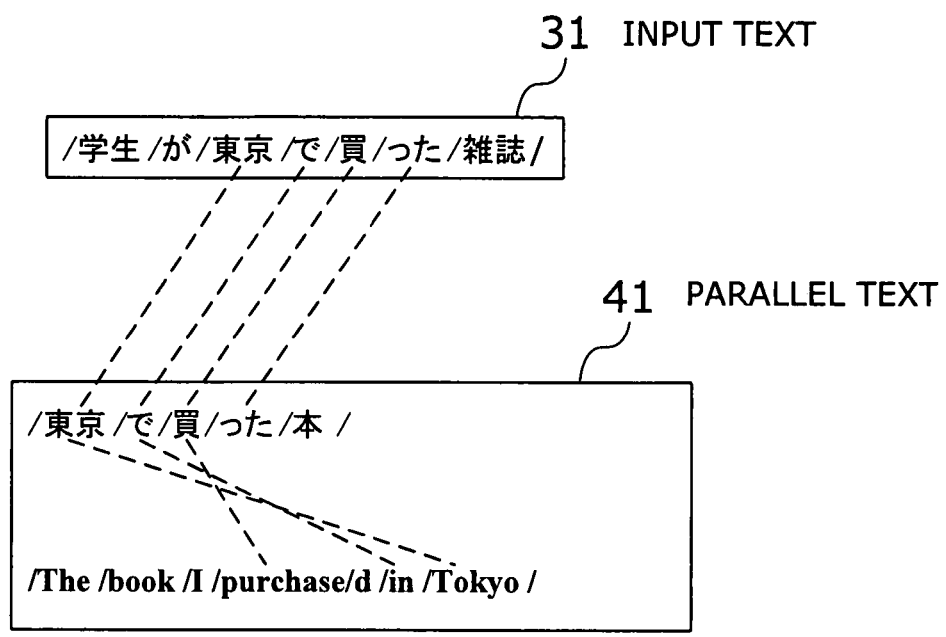
FIG. 26 shows an example alignment of morphemes between the source text part and target text part of a parallel text.

FIG. 26 shows an example alignment of morphemes between the source text part and target text part of a parallel text 41. The source segment and its translation have been divided into morphemes as a result of morphological analysis. Some source-language morphemes match the input text 31, which are: " 東京 ",(Tokyo), " で " (de), " 買 ", (ka), and " った " (tta). Target-language words corresponding to those morphemes are retrieved from the translation dictionary of FIG. 25. It is then examined whether any of the retrieved target-language words can be found in the morpheme sequence of the target text. If there is a match, that morpheme pair is found to be parallel.

The translation memory system of the third embodiment discovers morpheme-class parallel texts in this way. Specifically, FIG. 26 shows the following parallel texts:

東京—Tokyo

で—in

買—purchase

An emphasis flag is given to those target-language morphemes corresponding to source-language morphemes matching with the input text.

Figure 27:
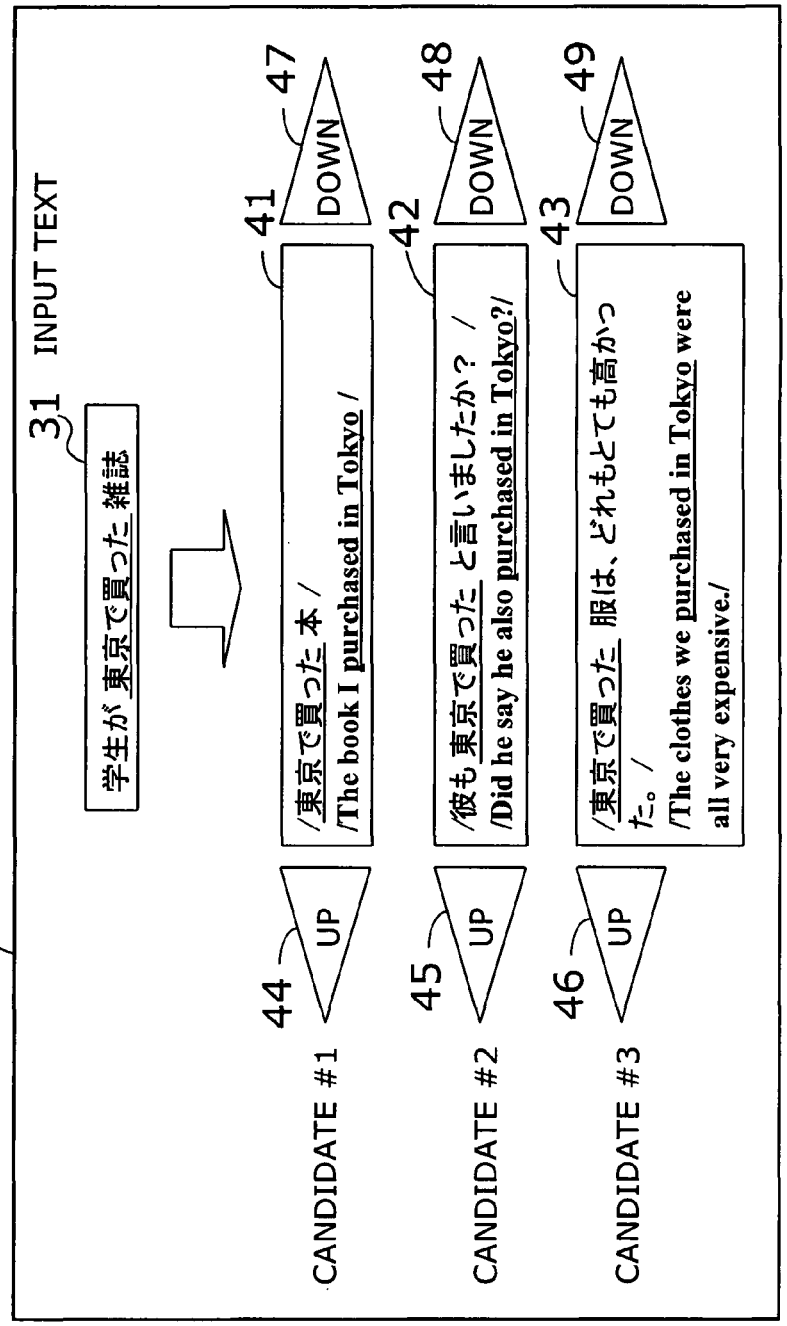
FIG. 27 shows an example of emphasis placed on target-language words corresponding to matched morphemes.

FIG. 27 shows an example of emphasis placed on target-language words corresponding to matched source-language morphemes. The illustrated search result screen 40b of the third embodiment emphasizes the morphemes that the input text 31 and parallel texts 41 to 43 have in common, not only in source-language words, but also in target-language words. The example of FIG. 27 uses underlines for emphasis.

Figure 28:
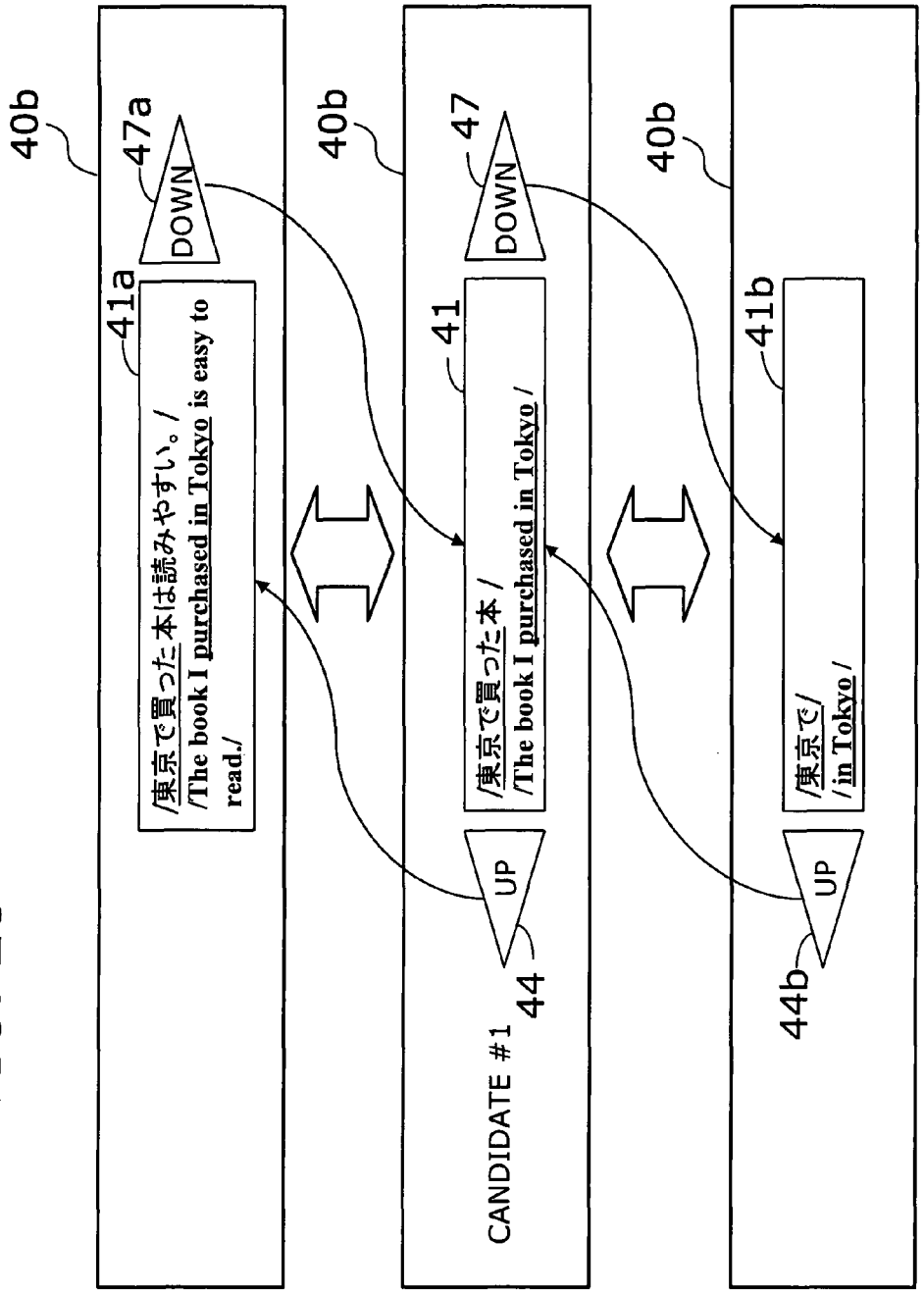
FIG. 28 shows an example of expanding and shrinking of view ranges according to the third embodiment.

The user may press a button to change the view range of a parallel text. In that case, a newly displayed parallel text with an expanded or shrunk range will also have their matched morphemes emphasized. FIG. 28 shows an example of view range selection according to the third embodiment of the invention. The illustrated search result screen 40b gives emphasis on both source-language and target-language morphemes that match with the input text 31 even for non-representative parallel texts, thus making it easier for the user to identify which part of the retrieved text can be used for his/her translation work.

Fourth Embodiment

This section describes a translation memory system according to a fourth embodiment of the present invention, which handles a document, or text information including multiple sentences. The fourth embodiment allows the user to retrieve and view a document including a source sentence. This feature is made possible by introducing an expanded class to the source text part of parallel texts. Since a document is often formed from a plurality of paragraphs, the fourth embodiment first introduces the concept of paragraph and then expands paragraphs into a document.

Figure 29:
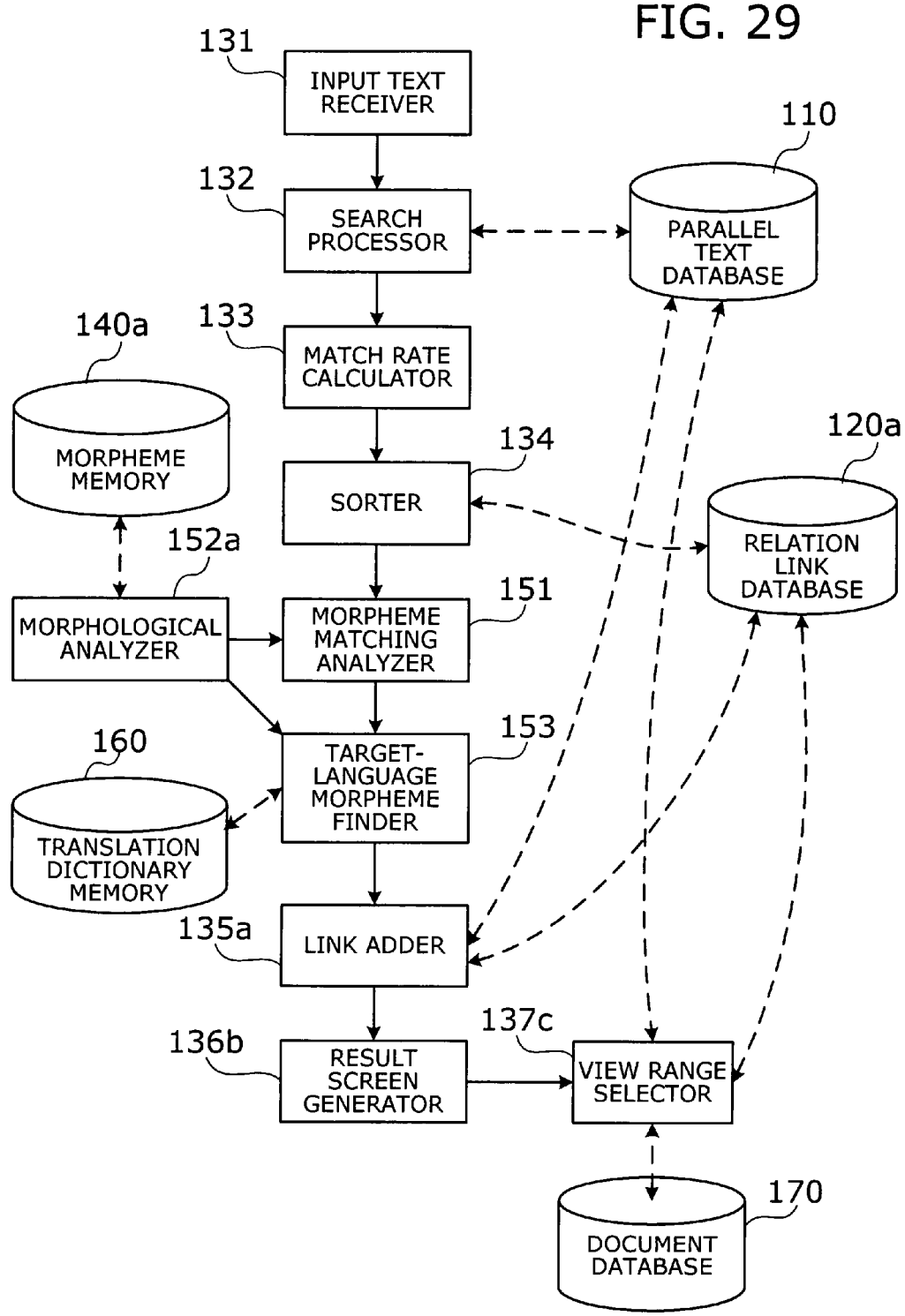
FIG. 29 is a functional block diagram of a translation memory system according to a fourth embodiment of the invention.

FIG. 29 is a functional block diagram of a translation memory system according to the fourth embodiment of the invention. Many of the elements shown in FIG. 29 have the same functions as those in the third embodiment of FIG. 23. The following description will, therefore, focus on new or modified elements while assigning like reference numerals to like elements.

In short, the fourth embodiment differs from the third embodiment in the following points: First, it includes a document database 170 in addition to all elements of the third embodiment. Second, the fourth embodiment differs in its relation link database 120a, link adder 135a, and view range selector 137c. More specifically, the relation link database 120a has an extended data structure, compared with the relation link database 120 of the third embodiment. The link adder 135a and view range selector 137c have more functions than the link adder 135 and view range selector 137b of the third embodiment.

The document database 170 is a collection of documents that have been used as the source of parallel texts currently stored in the parallel text database 110. A storage space of the HDD 103, for example, may be allocated for this purpose. For a document formed from a plurality of paragraphs, the document database 170 stores data of such paragraphs, in addition to the document itself.

Besides having the function of the relation link database 120 according to the third embodiment, the relation link database 120a stores relation links to documents and paragraphs. That is, the relation link database 120a of the fourth embodiment stores relation links between texts of various levels, from sentence subsegment level to document level.

The link adder 135a not only provides every function of the link adder 135 according to the third embodiment, but also adds an upward relation link to a source text to associate it with a paragraph containing that source text. Further, the link adder 135a adds an upward relation link to a source paragraph to associate it with a document containing that paragraph. In the case of a single-paragraph document, the link adder 135a adds an upward relation link to a source text to associate it with a document containing that source text.

The view range selector 137c provides every function of the view range selector 137b according to the third embodiment. In addition, the view range selector 137c allows the user to expand the view range up to a paragraph or document containing a source text.

Figure 30:
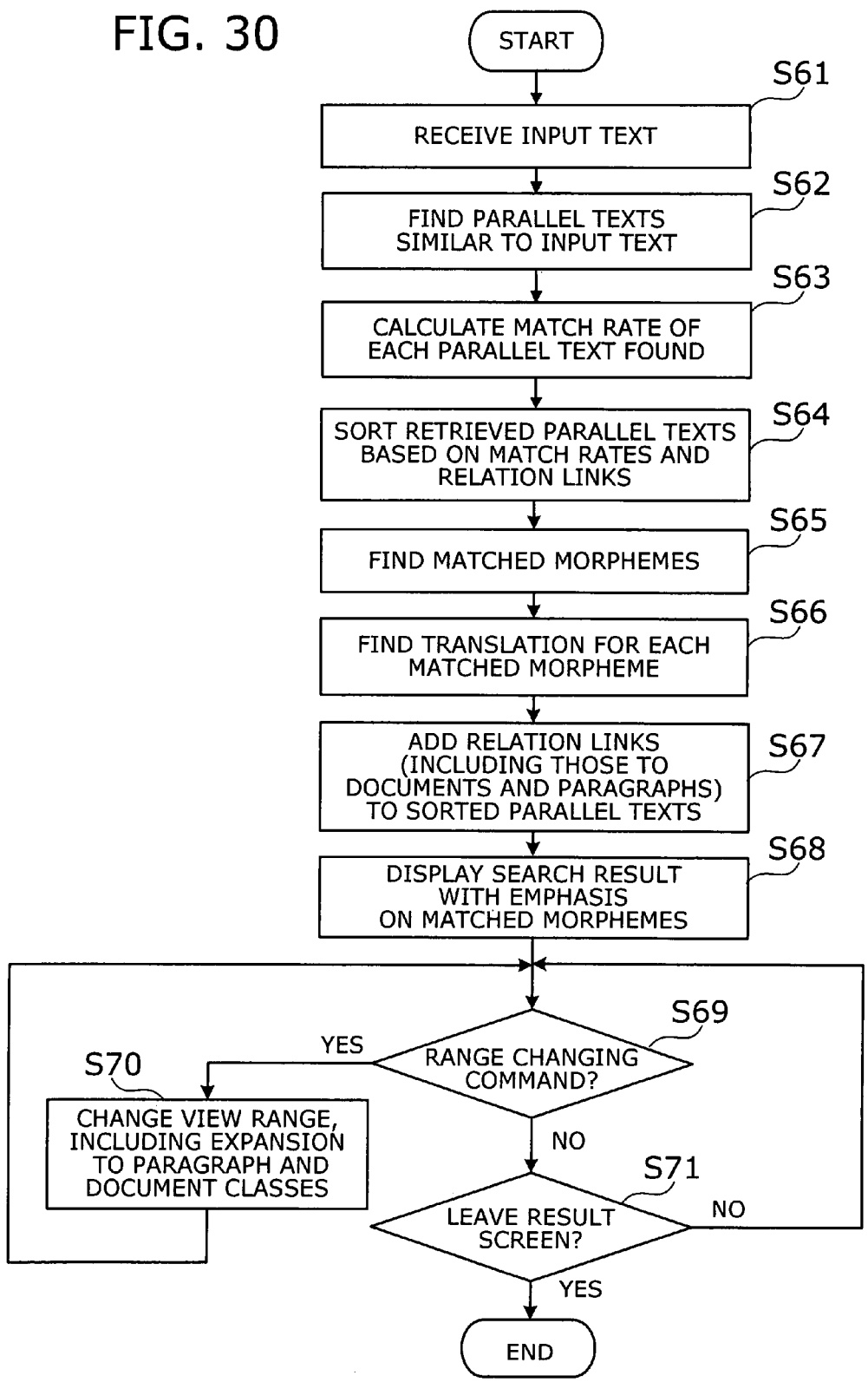
FIG. 30 is a flowchart of a translation memory search according to the fourth embodiment.

FIG. 30 is a flowchart of a translation memory search according to the fourth embodiment. This process proceeds according to steps S61 to S71. Steps S61 to S66, S68, S69, and S71 are equivalent to steps S41 to S46, S48, S49, and S51 of the third embodiment shown in the flowchart of FIG. 24. The following description will focus on other steps that are different from the third embodiment.

(Step S67) The link adder 135a adds relation links to sorted parallel texts, including links to paragraphs or documents, to associate them with other parallel texts.

(Step S70) The view range selector 137c changes the view range of a parallel text on the search result screen according to a user command. More specifically, the view range selector 137c responds to an expand command specifying an upward relation link by replacing the currently displayed parallel text with an upper-class parallel text pointed at by that relation link. If the currently displayed parallel text is of sentence class, the view range will be expanded to a paragraph containing that sentence. The view range selector 137c retrieves the text of this paragraph from the document database 170. Now that the retrieved paragraph is displayed on the search result screen, the system may receive an expansion command for that paragraph. The view range selector 137c then retrieves a document containing the paragraph from the document database 170 and outputs it on an updated search result screen.

As can be seen from the above, the fourth embodiment prepares a document database 170 containing paragraph and document entries that can be linked from source sentences. This feature of the fourth embodiment permits the user to see how a retrieved text is actually used in the paragraph or document. The user can therefore determine more precisely whether the retrieved parallel text can be reused in his/her work.

Figure 31:
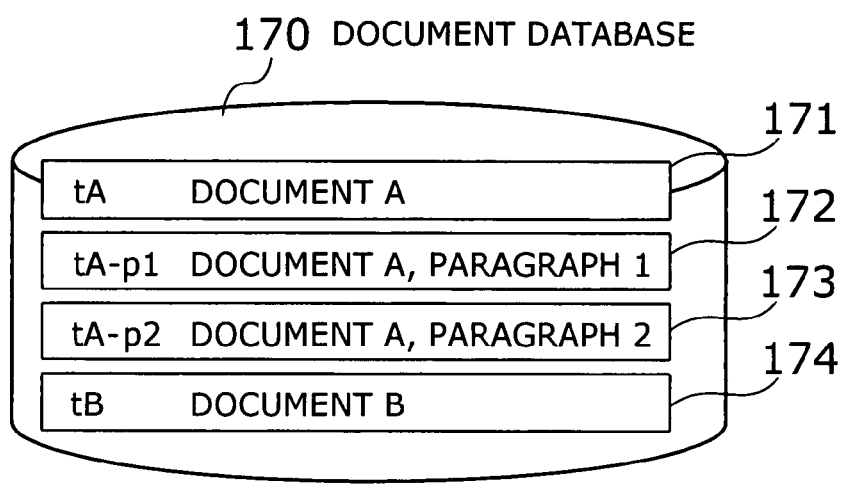
FIG. 31 shows example entries of a document database.

FIG. 31 shows example entries of the document database 170. The illustrated document database 170 contains entries of document-class parallel texts 171 and 174 and paragraph-class parallel texts 172 and 173. The latter two entries are actually a subset of the document-class parallel text 171. Each document-class parallel text 171 and 174 includes the entire source document text and its translation. Likewise, each paragraph-class parallel text 172 and 173 includes the entire source paragraph text and its translation.

The document-class parallel texts 171 and 174 are distinguished from each other by their unique identifiers. In the example of FIG. 31, the former parallel text 171 has an identifier of "tA" while the latter parallel text 174 has an identifier of "tB."

The paragraph-class parallel texts 172 and 173 are distinguished from each other by their unique paragraph identifiers, which are each composed of a document identifier and an identifier that is unique at least within a document. For example, the parallel text 172, a subset of the document A's parallel text 171, is identified by its unique paragraph identifier "tA-p1."

Figure 32:
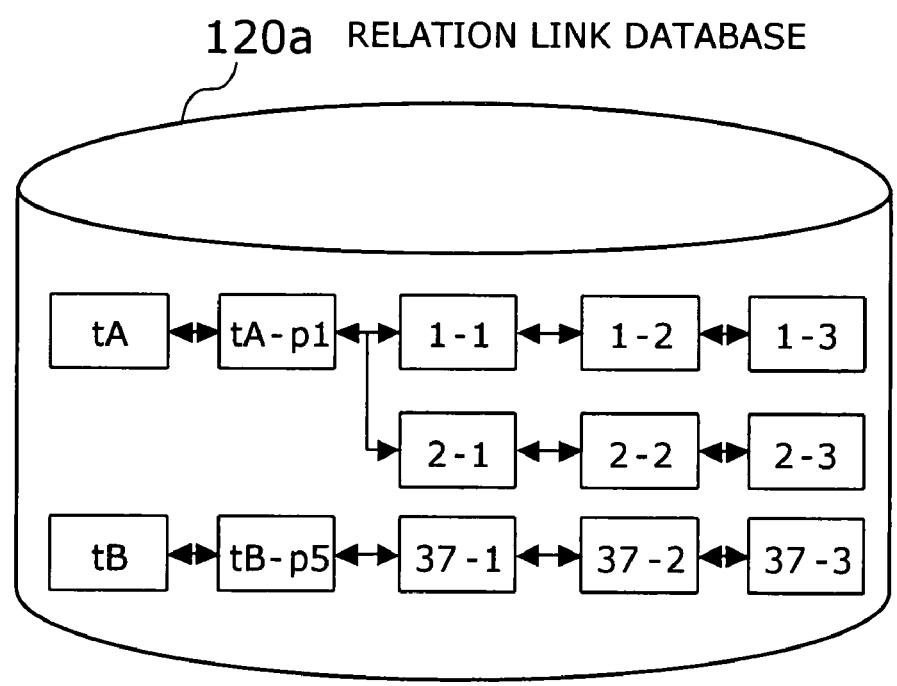
FIG. 32 shows an example data structure of a relation link database.

FIG. 32 shows an example data structure of the relation link database 120a according to the fourth embodiment. This relation link database 120a contains entries that define links between parallel text identifiers. In FIG. 32, relation links are represented by arrows. A rightward arrow is a relation link from an upper-class parallel text to a lower-class parallel text. A leftward arrow is a relation link from a lower-class parallel text to an upper-class parallel text.

According to the fourth embodiment, the relation link database 120a contains relation links from sentence-class parallel texts to paragraph-class parallel texts. For example, the parallel text 1-1 is linked to its upper-class parallel text tA-p1.

The relation link database 120*a* also contains reverse relation links, from paragraph-class parallel texts to sentence-class parallel texts. Further, the relation link database 120*a* contains relation links from paragraph class to document class. For example, the parallel text tA-p1 is linked to its upper-class parallel text tA. Also contained are reverse relation links, from document class to paragraph class. The above-described relation links enable the system to move up and down the containment hierarchy including paragraph and document classes.

Figure 33:
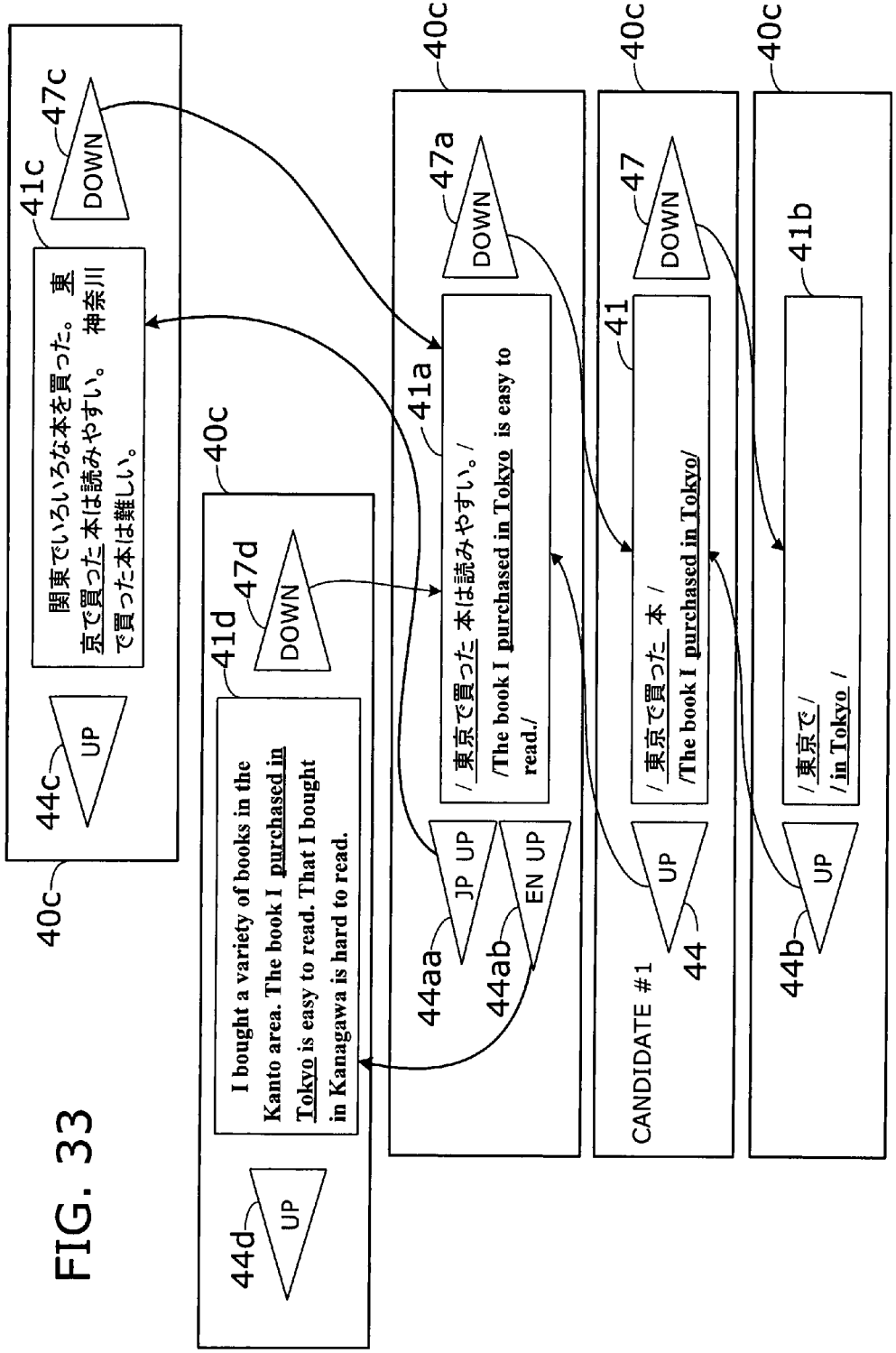
FIG. 33 shows transitions between elements that occur when tracing relation links of a document and its paragraphs.

FIG. 33 shows transitions between elements that occur when tracing relation links of a document and its paragraphs. The illustrated search result screen 40*c* of the fourth embodiment shows a segment-class parallel text 41 as a representative parallel text, together with an UP button 44 and a DOWN button 47. When the user presses the DOWN button 47, a lower-class parallel text 41*b* appears in place of the current parallel text 41. Similarly, when the user presses the UP button 44, an upper-class parallel text 41*a* replaces the current parallel text 41. In the example of FIG. 33, the new parallel text 41*a* is of sentence class.

The sentence-class parallel text 41*a* is displayed with a JP UP button 44*aa* and an EN UP button 44*ab*. The JP UP button 44*aa* is used to call up a source-language paragraph containing the current source sentence, while the EN UP button 44*ab* is used to call up a target-language paragraph translated from the source-language paragraph.

When the user presses the JP UP button 44*aa*, a Japanese paragraph 41*c* containing the source sentence appears on the search result screen 40*c*. This new search result screen 40*c* offers an UP button 44*c* and a DOWN button 47*c*. Pressing the UP button 44*c* permits the user to move up to a document (not shown) containing the paragraph 41*c*. Pressing the DOWN button 47*c*, on the other hand, permits the user to move down to the sentence-class parallel text 41*a*.

When the user presses the EN UP button 44*ab*, an English paragraph 41*d* appears on the search result screen 40*c*, which is a translation of the Japanese paragraph 41*c* containing the source sentence. This new search result screen 40*c* offers an UP button 44*d* and a DOWN button 47*d*. Pressing the UP button 44*d* permits the user to move up to a translation of a document (not shown) containing the paragraph 41*c*. Pressing the DOWN button 47*d*, on the other hand, permits the user to move down to the sentence-class parallel text 41*a*.

As can be seen from the above example, the fourth embodiment traces upward relation links from a retrieved parallel text, thereby displaying a paragraph or document containing the retrieved text. The function of emphasizing (underlining) morphemes matching an input text can also be applied to such paragraphs and documents. Thus the user can view the text in an expanded range without losing track of the matched portions.

As FIG. 33 has shown, the search result screen gives a paragraph or document not in parallel text form, but in monolingual form (i.e., either in source language or in target language). This is because of a limitation of display areas. That is, since a document (and a paragraph as well) generally takes up a large screen space, the search result screen could be occupied by the document alone if it contains both source-language and target-language texts. This makes it difficult for the user to compare the selected candidate translation with other search results. The fourth embodiment of the present invention saves screen space by presenting search results in either the source language or target language. This feature enables the user to view multiple instances even if the view range is expanded to a paragraph or document.

To emphasize matched morphemes in a source-language paragraph or document, the view range selector 137*c* searches that paragraph or document by using, for example, a given source sentence as a search key. If a similar sentence is found, then the view range selector 137*c* divides the found sentence into morphemes and determine whether any of them coincides with matched morphemes of the source sentence. If such morphemes are found, the view range selector 137*c* emphasizes them on the search result screen.

Likewise, to emphasize matched morphemes in a target-language paragraph or document, the view range selector 137*c* searches the paragraph or document by using, for example, a translation of a given source sentence as a search key. If a similar sentence is found, then the view range selector 137*c* divides the found sentence into morphemes and determine whether any of them coincides with matched morphemes of the translation of the source sentence. If such morphemes are found, the view range selector 137*c* emphasizes them on the search result screen.

Computer-Based Implementation

The above-described processing mechanisms of the present invention are actually implemented on a computer system, the instructions being encoded and provided in the form of computer programs. A computer system executes such programs to provide the intended functions of the present invention. The programs are stored in a computer-readable medium for the purpose of storage and distribution. Suitable computer-readable storage media include magnetic storage media, optical discs, magneto-optical storage media, and solid state memory devices. Magnetic storage media include hard disk drives (HDD), flexible disks (FD), and magnetic tapes. Optical disc media include digital versatile discs (DVD), DVD-RAM, compact disc read-only memory (CD-ROM), CD-Recordable (CD-R), and CD-Rewritable (CD-RW). Magneto-optical storage media include magneto-optical discs (MO).

Portable storage media, such as DVD and CD-ROM, are suitable for distribution of program products. Network-based distribution of software programs may also be possible, in which case several master program files are made available on a server computer for downloading to other computers via a network.

A user computer stores necessary software components in its local storage unit, which have previously been installed from a portable storage media or downloaded from a server computer. The computer executes the programs read out of the local storage unit, thereby performing the programmed functions. As an alternative way of program execution, the computer may execute programs, reading out program codes directly from a portable storage medium. Another alternative method is that the user computer dynamically downloads programs from a server computer when they are demanded and executes them upon delivery.

CONCLUSION

In summary, the present invention adds an upward or downward link to parallel texts retrieved from multiple-class database entries, so that the view range can be expanded to show a surrounding context or shrunk to a smaller segment to save the space. This variable-range display function permits the user to go back and forth between a wider view and a narrower view when he/she browses a retrieved parallel text on the computer screen. The present invention thus alleviates the user's burden of determining which part of the text can be reused in his/her translation work.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A non-transitory computer-readable medium storing a program for searching a translation memory and displaying retrieved translations, the program causing a computer to function as:
   a parallel text memory storing a plurality of parallel texts each being a text in a source language together with a translation thereof in a target language, the parallel texts including: (a) sentence-class parallel texts each being a source sentence together with a translation thereof, and (b) segment-class parallel texts each being a source segment together with a translation thereof, the source segment being a part of the source sentence;
   a relation link memory storing relation links representing containment relationships between the source sentences and source segments, wherein a containing text and a contained text are located respectively at an upper level and a lower level in a containment hierarchy;
   an input text receiver that receives an input text as an object to be analyzed and translated;
   a search processor that searches the parallel text memory using the input text as a search key to retrieve parallel texts whose source sentences or source segments are relevant to the input text;
   a match rate calculator that calculates a match rate of each parallel text retrieved by the search processor, the match rate representing the number of common characters found in both the input text and the source sentence or source segment of each parallel text;
   a link adder that adds a downward link to each retrieved sentence-class parallel text by consulting the relation link memory so as to link that sentence-class parallel text to a segment-class parallel text, as well as adding an upward link to each retrieved segment-class parallel text by consulting the relation link memory so as to link that segment-class parallel text to a sentence-class parallel text;
   a result screen generator that produces a search result screen showing a segment-class parallel text with a highest match rate, which is selected out of all the retrieved segment-class parallel texts; and
   a view range selector that replaces the currently displayed segment-class parallel text with a sentence-class parallel text pointed at by the upward link added to the currently displayed segment-class parallel text, in response to an expand command.

2. The non-transitory computer-readable medium according to claim 1, wherein the search processor retrieves a parallel text whose source-language text has at least one common character that is also found in the input text.

3. The non-transitory computer-readable medium according to claim 1, the program further causing the computer to function as a sorter that sorts the retrieved parallel texts into groups each deriving from one source sentence and source segments thereof, then extracts a best matching parallel text from each group, and sorts the extracted parallel texts in descending order of the best match rate of each group, wherein the result screen generator produces a search result screen showing the extracted parallel texts in the sorted order.

4. The non-transitory computer-readable medium according to claim 1, wherein:
   the parallel texts stored in the parallel translation memory further include subsegment-class parallel texts each being a source subsegment together with a translation thereof, the source subsegment being a part of the source segment;
   the relation link memory further stores relation links representing containment relationships between the source segments and source subsegments; and
   the link adder adds a downward link to each retrieved segment-class parallel text so as to link that segment-class parallel text to a subsegment-class parallel text that is retrieved.

5. The non-transitory computer-readable medium according to claim 1, wherein:
   the parallel texts further include (c) subsegment-class parallel texts each being a source subsegment together with a translation thereof, the source subsegment being a part of the source segment; and
   the view range selector replaces the displayed segment-class parallel text with a subsegment-class parallel text pointed at by the downward link of the currently displayed segment-class parallel text, in response to a shrink command.

6. The non-transitory computer-readable medium according to claim 5, wherein:
   the result screen generator produces expand and shrink buttons representing upward and downward links of the displayed segment-class parallel text, so that depression of the expand and shrink buttons serve as the expand and shrink commands, respectively; and
   the view range selector produces a new expand button and a new shrink button for the sentence-class or segment-class parallel text newly displayed on the search result screen as a result of the depression of the expand button or shrink button, such that the new expand and shrink buttons will represent upward and downward links of the newly displayed parallel text.

7. The non-transitory computer-readable medium according to claim 1, wherein:
   (a) the program further causes the computer to function as:
   a morpheme memory storing a collection of source-language morphemes,
   a morphological analyzer that performs a morphological analysis on the input text and the source sentence or source segment of each retrieved parallel text by consulting the collection of source-language morphemes, and
   a morpheme matching analyzer that detects matched morphemes that exist in both the input text and each retrieved parallel text; and
   (b) the result screen generator places visual emphasis on the matched morphemes.

8. The non-transitory computer-readable medium according to claim 7, wherein the view range selector places visual emphasis on the matched morphemes of a parallel text newly displayed in response to the expand or shrink command.

9. The non-transitory computer-readable medium according to claim 7, wherein:
   (a) the morpheme memory further stores a collection of target-language morphemes;
   (b) the morphological analyzer further performs a morphological analysis on the translation of the source sentence or source segment of each retrieved parallel text, by consulting the collection of target-language morphemes;

(c) the program further causes the computer to function as:
a translation dictionary memory storing a translation dictionary providing source-language morphemes associated with equivalent target-language morphemes, and
a target-language morpheme finder that finds, by consulting the translation dictionary, target-language morphemes corresponding to morphemes of the source sentence or source segment of each retrieved parallel text; and (d) the result screen generator places visual emphasis on the target-language morphemes that the target-language morpheme finder has found, as well as on the matched morphemes.

10. The non-transitory computer-readable medium according to claim 9, wherein the view range selector places visual emphasis on the matched morphemes and translated morphemes of a parallel text newly displayed in response to the expand or shrink command.

11. The non-transitory computer-readable medium according to claim 1, wherein:
the program further causes the computer to function as a document memory storing paragraphs constituting a document;
the relation link memory further stores relation links representing containment relationships between the paragraphs and the document in the containment hierarchy;
the link adder further adds an upward link to each retrieved sentence-class parallel text by consulting the relation link memory, so as to link that sentence-class parallel text to one of the paragraphs stored in the document memory; and
the view range selector replaces, in response to an expand command, a sentence-class parallel text on the search result screen with a text of the paragraph linked from that sentence-class parallel text.

12. The non-transitory computer-readable medium according to claim 11, wherein:
the document memory further stores a translation of each of the paragraphs;
the link adder adds a source-language upward link to each retrieved sentence-class parallel text, so as to link that sentence-class parallel text to one of the paragraphs stored in the document memory;
the link adder further adds a target-language upper link to each retrieved sentence-class parallel text, so as to link that sentence-class parallel text to one of the translations of paragraphs stored in the document memory;
the view range selector replaces a sentence-class parallel text displayed on the search result screen with a text of the paragraph pointed at by the source-language upward link of that sentence-class parallel text, in response to an expand command; and
the view range selector replaces a sentence-class parallel text displayed on the search result screen with a text of the translation pointed at by the target-language upward link of that sentence-class parallel text, in response to a shrink command.

13. The non-transitory computer-readable medium according to claim 12, wherein:
the result screen generator produces two expand shrink buttons representing the source-language and target-language upward links of a sentence-class parallel text currently displayed on the search result screen;
the view range selector replaces the currently displayed sentence-class parallel text with a text of the paragraph pointed at by the source-language upward link of that sentence-class parallel text, upon depression of the expand button representing the source-language upward link; and
the view range selector replaces a sentence-class parallel text with a text of the translation pointed at by the target-language upward link of that sentence-class parallel text, upon depression of the expand button representing the target-language upward link.

14. An apparatus for searching a translation memory and displaying retrieved translations, the apparatus comprising:
a parallel text memory storing a plurality of parallel texts each being a text in a source language together with a translation thereof in a target language, the parallel texts including: (a) sentence-class parallel texts each being a source sentence together with a translation thereof, and (b) segment-class parallel texts each being a source segment together with a translation thereof, the source segment being a part of the source sentence;
a relation link memory storing relation links representing containment relationships between the source sentences and source segments, wherein a containing text and a contained text are located respectively at an upper level and a lower level in a containment hierarchy;
an input text receiver that receives an input text as an object to be analyzed and translated;
a search processor that searches the parallel text memory using the input text as a search key to retrieve parallel texts whose source sentences or source segments are relevant to the input text;
a match rate calculator that calculates a match rate of each parallel text retrieved by the search processor, the match rate representing the number of common characters found in both the input text and the source sentence or source segment of each parallel text;
a link adder that adds a downward link to each retrieved sentence-class parallel text by consulting the relation link memory so as to link that sentence-class parallel text to a segment-class parallel text, as well as adding an upward link to each retrieved segment-class parallel text by consulting the relation link memory so as to link that segment-class parallel text to a sentence-class parallel text;
a result screen generator that produces a search result screen showing a segment-class parallel text with a highest match rate, which is selected out of all the retrieved segment-class parallel texts; and
a view range selector that replaces the currently displayed segment-class parallel text with a sentence-class parallel text pointed at by the upward link added to the currently displayed segment-class parallel text, in response to an expand command.

15. A method of searching a translation memory and displaying retrieved translations, the method comprising:
storing, by a processor, a plurality of parallel texts each being a text in a source language together with a translation thereof in a target language, the parallel texts including: (a) sentence-class parallel texts each being a source sentence together with a translation thereof, and (b) segment-class parallel texts each being a source segment together with a translation thereof, the source segment being a part of the source sentence;
storing, by the processor, relation links representing containment relationships between the source sentences and source segments, wherein a containing text and a contained text are located respectively at an upper level and a lower level in a containment hierarchy;

receiving, by the processor, an input text as an object to be analyzed and translated;

searching, by the processor, the stored parallel texts using the input text as a search key to retrieve parallel texts whose source sentences or source segments are relevant to the input text;

calculating, by the processor, a match rate of each retrieved parallel text, the match rate representing the number of common characters found in both the input text and the source sentence or source segment of each parallel text;

adding, by the processor, a downward link to each retrieved sentence-class parallel text according to the relation links so as to link that sentence-class parallel text to a segment-class parallel text;

adding, by the processor, an upward link to each retrieved segment-class parallel text according to the relation links so as to link that segment-class parallel text to a sentence-class parallel text;

producing, by the processor, a search result screen showing a segment-class parallel text with a highest match rate, which is selected out of all the retrieved segment-class parallel texts; and replacing, by the processor, the currently displayed segment-class parallel text with a sentence-class parallel text pointed at by the upward added to the currently displayed segment-class parallel text, in response to an expand command.

* * * * *